United States Patent
Ehara et al.

(10) Patent No.: US 12,283,819 B2
(45) Date of Patent: Apr. 22, 2025

(54) CONTROL SYSTEM AND POWER BALANCING METHOD

(71) Applicant: TOYOTA JIDOSHA KABUSHIKI KAISHA, Toyota (JP)

(72) Inventors: Masato Ehara, Susono (JP); Rentaro Kuroki, Susono (JP); Shunsuke Kobuna, Susono (JP); Tatsuro Kiyohara, Nagoya (JP); Naohiro Seo, Sunto-gun (JP); Takaharu Tateishi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 479 days.

(21) Appl. No.: 17/663,768

(22) Filed: May 17, 2022

(65) Prior Publication Data
US 2023/0019914 A1   Jan. 19, 2023

(30) Foreign Application Priority Data
Jul. 16, 2021 (JP) .................................. 2021-117959

(51) Int. Cl.
*H02J 3/32* (2006.01)
*H02J 3/00* (2006.01)
*H02J 3/14* (2006.01)

(52) U.S. Cl.
CPC .............. *H02J 3/322* (2020.01); *H02J 3/003* (2020.01); *H02J 3/14* (2013.01)

(58) Field of Classification Search
CPC ............. H02J 3/322; H02J 3/003; H02J 3/14
See application file for complete search history.

(56) References Cited

U.S. PATENT DOCUMENTS

| | | | |
|---|---|---|---|
| 2012/0086399 A1* | 4/2012 | Choi | H02J 7/0029 320/116 |
| 2013/0049457 A1* | 2/2013 | Komatsu | B60L 58/22 429/10 |
| 2015/0002102 A1* | 1/2015 | Ohashi | H02J 7/0025 320/135 |
| 2017/0126043 A1* | 5/2017 | Yoshida | H02J 7/0014 |
| 2018/0022227 A1* | 1/2018 | Foldesi | H02J 7/0063 307/10.1 |
| 2020/0231056 A1 | 7/2020 | Sadano et al. | |

(Continued)

FOREIGN PATENT DOCUMENTS

JP   2020-115704 A   7/2020

*Primary Examiner* — Gary Collins
(74) *Attorney, Agent, or Firm* — Finnegan, Henderson, Farabow, Garrett and Dunner LLP

(57) ABSTRACT

A control system includes a computer that controls each of multiple power balancing resources. The computer selects one or more control targets to be used for power balancing of an external electric power source from the power balancing resources, and controls each of the one or more control targets so as to cause the power storage device to charge or discharge for the power balancing. The computer preferentially selects the power balancing resource provided with a small-capacity power storage device as the control target for the power balancing of which duration is shorter than a predetermined time, and preferentially selects the power balancing resource provided with a large-capacity power storage device as the control target for the power balancing of which the duration is longer than the predetermined time.

9 Claims, 14 Drawing Sheets

(56) References Cited

U.S. PATENT DOCUMENTS

| | | | |
|---|---|---|---|
| 2022/0185148 A1* | 6/2022 | Kim | B60L 53/62 |
| 2023/0273262 A1* | 8/2023 | Lim | G01R 31/392 |
| | | | 320/134 |
| 2024/0275195 A1* | 8/2024 | Hara | H02J 7/007182 |

* cited by examiner

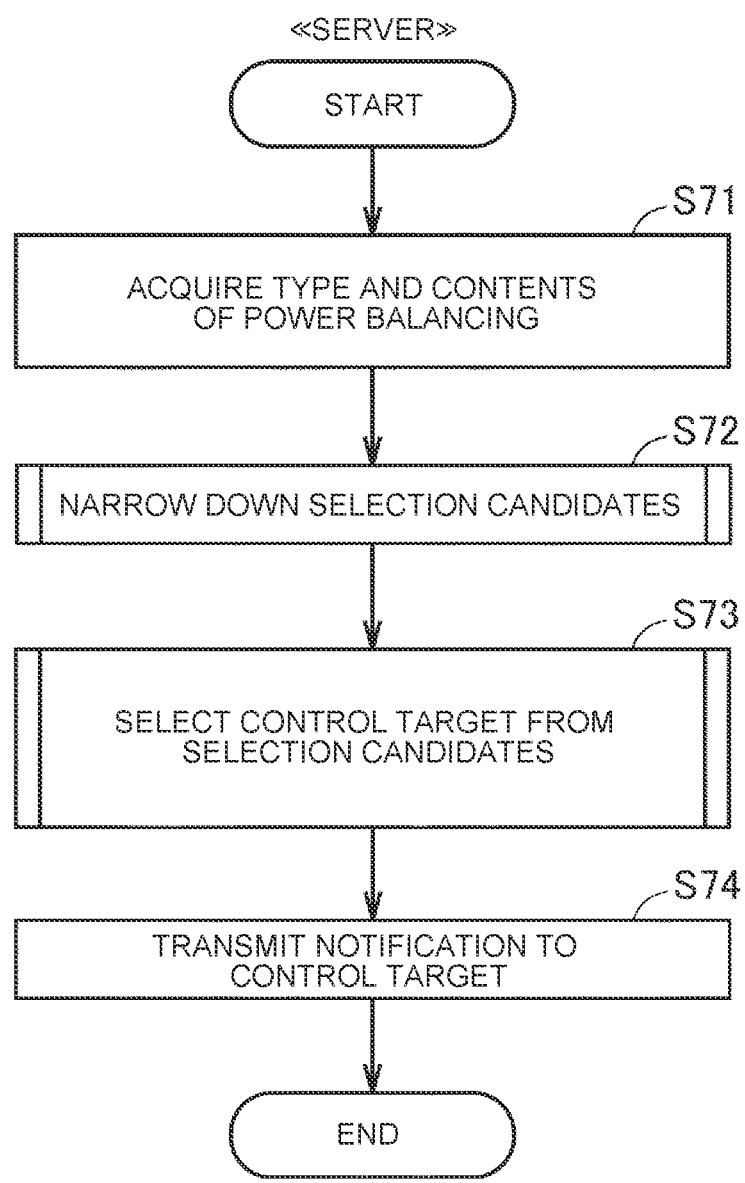

FIG. 8

«TYPE AND CONTENTS OF POWER BALANCING»

| POWER BALANCING | A | B | C | D | E | F | G | H | I | J |
|---|---|---|---|---|---|---|---|---|---|---|
| BALANCING POWER | PRIMARY BALANCING POWER | | SECONDARY BALANCING POWER | | | | TERTIARY BALANCING POWER | | | |
| | FCR | | S-FRR | | FRR | | RR | | RR-FIT | |
| COMMAND CONTROL | LOCAL CONTROL (OFFLINE) | | LFC SIGNAL | | EDC SIGNAL | | EDC SIGNAL | | ONLINE | |
| RESPONSE TIME | WITHIN 10 SECONDS | | WITHIN FIVE MINUTES | | WITHIN FIVE MINUTES | | WITHIN 15 MINUTES | | WITHIN 45 MINUTES | |
| DURATION | FIVE MINUTES | | 30 MINUTES | | 30 MINUTES | | THREE HOURS | | THREE HOURS | |
| CHARGE/ DISCHARGE | CHARGE | DIS-CHARGE | CHARGE | DIS-CHARGE | CHARGE | DIS-CHARGE | CHARGE | DIS-CHARGE | CHARGE | DIS-CHARGE |

CONTROL SYSTEM AND POWER BALANCING METHOD

CROSS-REFERENCE TO RELATED APPLICATION

This application claims priority to Japanese Patent Application No. 2021-117959 filed on Jul. 16, 2021, incorporated herein by reference in its entirety.

BACKGROUND

1. Technical Field

The present disclosure relates to a control system and a power balancing method.

2. Description of Related Art

For example, Japanese Unexamined Patent Application Publication No. 2020-115704 (JP 2020-115704 A) discloses a power balancing method for selecting a vehicle to transmit and receive electric power to and from a power grid in accordance with a power demand of the power grid. In this method, a vehicle provided with a power storage device (drive electric power source) in which an accumulated energy amount is larger than a predetermined accumulated amount and an accumulable energy amount is larger than a predetermined accumulable amount is selected.

SUMMARY

In the power balancing method described in JP 2020-115704 A, a vehicle provided with a high-capacity power storage device is selected as a control target to be used for power balancing of an external electric power source (for example, the power grid). However, an additional power balancing request may be received when the high-capacity power storage device is being used for power balancing. It is not always possible to secure a sufficient number of high-capacity power storage devices to meet all of multiple requests for power balancing. Therefore, it is required to conduct power balancing utilizing a low-capacity power storage device, in addition to the high-capacity power storage device. Further, when the high-capacity power storage device is preferentially selected all the time, a frequency of charging and discharging of the high-capacity power storage device increases, and the high-capacity power storage device is prone to deteriorate.

The present disclosure has been made to solve the above issue, and an object of the present disclosure is to select an appropriate power balancing resource in accordance with a type of power balancing when the power balancing is conducted using the control target selected from multiple power balancing resources.

A control system according to a first aspect of the present disclosure is a control system provided with a computer that controls each of multiple power balancing resources. Each of the power balancing resources includes a power storage device configured to be electrically connectable with an external electric power source. The computer is configured to select one or more control targets to be used for power balancing of an external electric power source from the power balancing resources, and control each of the one or more control targets so as to cause the power storage device to charge or discharge for the power balancing. The computer is configured to classify the power storage device into any of a large-capacity power storage device and a small-capacity power storage device with a full charge capacity smaller than a full charge capacity of the large-capacity power storage device. The computer is configured to preferentially select the power balancing resource provided with the small-capacity power storage device as the control target for the power balancing of which duration is shorter than a predetermined time, and preferentially select the power balancing resource provided with the large-capacity power storage device as the control target for the power balancing of which the duration is longer than the predetermined time.

Hereinafter, the computer will be also referred to as a "control computer". Further, the power balancing of which the duration is shorter than the predetermined time will also be referred to as "short-term power balancing", and the power balancing of which the duration is longer than the predetermined time will also be referred to as "long-term power balancing". Further, the power balancing resource provided with the large-capacity power storage device will also be referred to as a "large-capacity resource", and the power balancing resource provided with the small-capacity power storage device will also be referred to as a "small-capacity resource".

The control computer classifies the power storage device included in the power balancing resource into any of the large-capacity power storage device and the small-capacity power storage device. The control computer identifies the power storage device belonging to the large-capacity power storage device as a power storage device having a larger full charge capacity than that of the power storage device belonging to the small-capacity power storage device. The above classification makes it easier for the control computer to select the control target used for power balancing of the external electric power source. Note that, the full charge capacity of the power storage device corresponds to the amount of electricity stored in the power storage device at the time of full charge.

It is highly possible that the request for the short-term power balancing can be met by both the large-capacity resources and the small-capacity resources. On the other hand, it is difficult to meet the request for the long-term power balancing with the small capacity resources. Therefore, in the above control system, the control computer is configured to preferentially select the small capacity resource in the selection of the control target for the short-term power balancing. With the above, the frequency of charging and discharging of the large-capacity power storage device is suppressed. As described above, according to the control system, deterioration of the large-capacity power storage device due to intensive use can be suppressed.

Further, by preferentially using the small capacity resource over the large capacity resource for the short-term power balancing, the large capacity resource can be preserved for the long-term power balancing. Then, for the long-term power balancing, the large-capacity resources are preferentially selected over the small-capacity resources in the selection of the control targets. Therefore, according to the above control system, it becomes easy to respond to many requests for power balancing.

According to the control system having the above configuration, when the power balancing is conducted by the control target selected from the multiple power balancing resources, an appropriate power balancing resource can be selected in accordance with the type of power balancing.

The external electric power source above may be a power grid (for example, a microgrid or a large-scale power grid developed as an infrastructure). The external electric power source above may supply alternate current (AC) power or direct current (DC) power. The control computer may be a stationary server or may be mounted on a mobile terminal.

Examples of the above power balancing resources are buildings (houses, factories, etc.), electrical equipment, unmanned mobile objects (automated guided vehicles (AGV), agricultural machinery, walking robots, drones, robot cleaners, space probes, etc.), and vehicles (automobiles, railroad vehicles, ship, airplanes, etc.).

The control computer may include a first estimation unit described below. A first estimation unit is configured to acquire, for the power balancing resource that is an electrified vehicle configured to travel using electric power stored in the power storage device, first vehicle information indicating whether the electrified vehicle includes an internal combustion engine, and estimate that the power storage device of the electrified vehicle is the large-capacity power storage device when the electrified vehicle does not include the internal combustion engine and estimate that the power storage device of the electrified vehicle is the small-capacity power storage device when the electrified vehicle includes the internal combustion engine.

The method of managing information on the electrified vehicle differs depending on the automobile manufacturer. The control computer is not always free to acquire desired information on the electrified vehicle. However, even when the control computer in the above control system cannot acquire information indicating the full charge capacity of the power storage device mounted on the electrified vehicle, the control computer can classify the power storage device mounted on the electrified vehicle into any of the large-capacity power storage device and the small-capacity power storage device only by acquiring at least the first vehicle information. The first vehicle information is information indicating the basic structure of the electrified vehicle, and there is a high possibility that the control computer can acquire the first vehicle information from the electrified vehicle.

The electrified vehicles that are currently in widespread use can be broadly classified into a battery electric vehicle (BEV) that does not include an internal combustion engine and a plug-in hybrid electric vehicle (PHEV) that includes the internal combustion engine. The full charge capacity of the power storage device included in the BEV tends to be larger than the full charge capacity of the power storage device included in the PHEV.

The control computer may include a second estimation unit described below. A second estimation unit is configured to acquire, for the power balancing resource that is an electrified vehicle configured to travel using electric power stored in the power storage device, second vehicle information indicating whether the electrified vehicle includes an energy storage device for traveling in addition to the power storage device, and estimate that the power storage device of the electrified vehicle is the large-capacity power storage device when the electrified vehicle does not include the energy storage device for traveling in addition to the power storage device and estimate that the power storage device of the electrified vehicle is the small-capacity power storage device when the electrified vehicle includes the energy storage device for traveling in addition to the power storage device.

The second vehicle information may be adopted instead of the first vehicle information described above. For example, in the PHEV, a fuel tank that supplies fuel to the internal combustion engine corresponds to the energy storage device for traveling in addition to the power storage device. In the future, in addition to the PHEVs, electrified vehicles provided with energy storage devices for traveling in addition to the power storage devices may become widespread. For example, in a fuel cell electric vehicle (FCEV) that has already been put into practical use, a hydrogen tank that supplies hydrogen to a fuel cell corresponds to the energy storage device for traveling in addition to the power storage device. It is considered that the full charge capacity required for the power storage device is smaller in the electrified vehicle provided with both the power storage device and the energy storage device for traveling in addition to the power storage device, as compared with the electrified vehicle provided with the power storage device only.

In any of the control systems described above, the control computer may further include an identification unit that acquires capacity information indicating a full charge capacity of the power storage device included in the power balancing resource, and identifies whether the power storage device of the power balancing resource is any of the large-capacity power storage device and the small-capacity power storage device based on the capacity information. The control computer may be configured to classify the power storage device of the power balancing resource that is the electrified vehicle into any of the large-capacity power storage device and the small-capacity power storage device using an estimation result by the estimation unit when the identification unit is not able to acquire the capacity information for the electrified vehicle. The control computer may be configured to classify the power storage device of the power balancing resource that is the electrified vehicle into any of the large-capacity power storage device and the small-capacity power storage device using an identification result by the identification unit when the identification unit is able to acquire the capacity information for the electrified vehicle.

In the above control system, when the control computer can acquire the capacity information indicating the full charge capacity of the power storage device mounted on the electrified vehicle, the control computer classifies the power storage device of the electrified vehicle into any of the large-capacity power storage device and the small-capacity power storage device based on the capacity information. The control computer can classify the power storage device with high accuracy using the capacity information. Further, even when the control computer cannot acquire the above capacity information, the control computer can classify the power storage device of the electrified vehicle into any of the large-capacity power storage device and the small-capacity power storage device based on the vehicle information (the first vehicle information or the second vehicle information).

The control computer above may be configured to classify the power storage device into any of a high-temperature operating power storage device that is less prone to deteriorate by charging and discharging at a high temperature and a low-temperature operating power storage device that is prone to deteriorate by charging and discharging at a high temperature. The control computer above may be configured to exclude the power balancing resource provided with the low-temperature operating power storage device from a selection candidate for the control target related to the power balancing when an outside temperature for conducting the power balancing is equal to or higher than a reference temperature.

According to the above control system, it is possible to exclude the power balancing resource provided with the power storage device that is prone to deteriorate by charging and discharging at a high temperature from the selection candidates for the control target for the power balancing under an environment where the outside air temperature is high. With the above, deterioration of the power storage device is suppressed.

The control computer may be configured to predict a state of charge of the power storage device for each of the power balancing resources when the power balancing is conducted, and determine whether the power balancing is able to be conducted by the power storage device using the predicted state of charge of the power storage device. Then, the control computer above may be configured to exclude the power balancing resource provided with the power storage device determined that the power balancing is not able to be conducted from a selection candidate for the control target.

According to the above control system, it is possible to exclude the power balancing resource provided with the power storage device in which it is predicted that the state of charge is not suitable for power balancing when the power balancing is conducted from the selection candidates for the control target. This makes it easier to select the power balancing resource that matches power balancing.

The state of charge (SOC) indicates the remaining amount of electricity stored, and, for example, the ratio of the current amount of electricity stored to the amount of electricity stored in a fully charged state is expressed by 0 to 100%.

The control computer above may be configured to predict an SOC of the power storage device of the control target when the power balancing is conducted, and when the predicted SOC of the power storage device of the control target does not correspond to charging electric energy or discharging electric energy required for the power balancing, adjust the SOC of the power storage device of the control target so as to correspond to the charging electric energy or the discharging electric energy required for the power balancing before the power balancing is conducted.

According to the above control system, the SOC of the power storage device of the control target can be adjusted to the SOC suitable for the power balancing. This makes it easier to meet power balancing requests depending on the selected control target.

The control computer above may be configured to cause the power balancing resource provided with the small-capacity power storage device to charge or discharge for the power balancing by local control or remote control when the power balancing resource provided with the small-capacity power storage device is included in a selection candidate for the control target for the power balancing of which the duration is shorter than the predetermined time. The control computer above may be configured to cause the power balancing resource provided with the large-capacity power storage device to charge or discharge for the power balancing by the remote control when the power balancing resource provided with the large-capacity power storage device is included in the selection candidate for the control target for the power balancing of which the duration is longer than the predetermined time.

According to the above configuration, the control computer can perform charging or discharging in accordance with the power balancing using the power balancing resource suitable for the power balancing. The local control of the power balancing resource also enables power balancing with very short response time.

A control system according to a second aspect of the present disclosure is a control system provided with a computer that controls each of multiple power balancing resources. Each of the power balancing resources includes a power storage device configured to be electrically connectable with an external electric power source. The computer is configured to select one or more control targets to be used for power balancing of an external electric power source from the power balancing resources, and control each of the one or more control targets so as to cause the power storage device to charge or discharge for the power balancing. The computer is configured to classify the power storage device into any of a large-capacity power storage device and a small-capacity power storage device with a full charge capacity smaller than a full charge capacity of the large-capacity power storage device. The computer is configured to preferentially select the power balancing resource provided with the small-capacity power storage device as the control target for the power balancing for adjusting a frequency of the external electric power source, and preferentially select the power balancing resource provided with the large-capacity power storage device as the control target for the power balancing for balancing supply and demand of the external electric power source.

According to the control system having the above configuration, similar to the control system according to the first aspect described above, when the power balancing is conducted by the control target selected from the multiple power balancing resources, an appropriate power balancing resource can be selected in accordance with the type of power balancing. In general, the power balancing for balancing the supply and demand of the external electric power source has a longer duration than a duration of the power balancing for adjusting the frequency of the external electric power source.

A power balancing method according to a third aspect of the present disclosure includes a classification process, a selection process, and a control process shown below.

In the classification process, the computer classifies a power storage device of each of multiple power balancing resources into any of a large-capacity power storage device and a small-capacity power storage device with a full charge capacity smaller than a full charge capacity of the large-capacity power storage device. In the selection process, the computer preferentially selects, when the computer selects one or more control targets to be used for power balancing of an external electric power source from the power balancing resources, the power balancing resource provided with the small-capacity power storage device as the control target for the power balancing of which duration is shorter than a predetermined time, and preferentially selects the power balancing resource provided with the large-capacity power storage device as the control target for the power balancing of which the duration is longer than the predetermined time. In the control process, the computer controls each of the one or more control targets so as to cause the power storage device to charge or discharge for the power balancing.

According to the above power balancing method, similar to the control system described above, when the power balancing is conducted by the control target selected from the multiple power balancing resources, an appropriate power balancing resource can be selected in accordance with the type of power balancing.

According to the present disclosure, it is possible to select an appropriate power balancing resource in accordance with the type and contents of the power balancing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a flowchart showing a process related to selection of a control target executed by the control computer (server) shown in FIG. 1;

FIG. 8 is a diagram showing an example of a type and contents of power balancing;

DETAILED DESCRIPTION OF EMBODIMENTS

Figure 1:
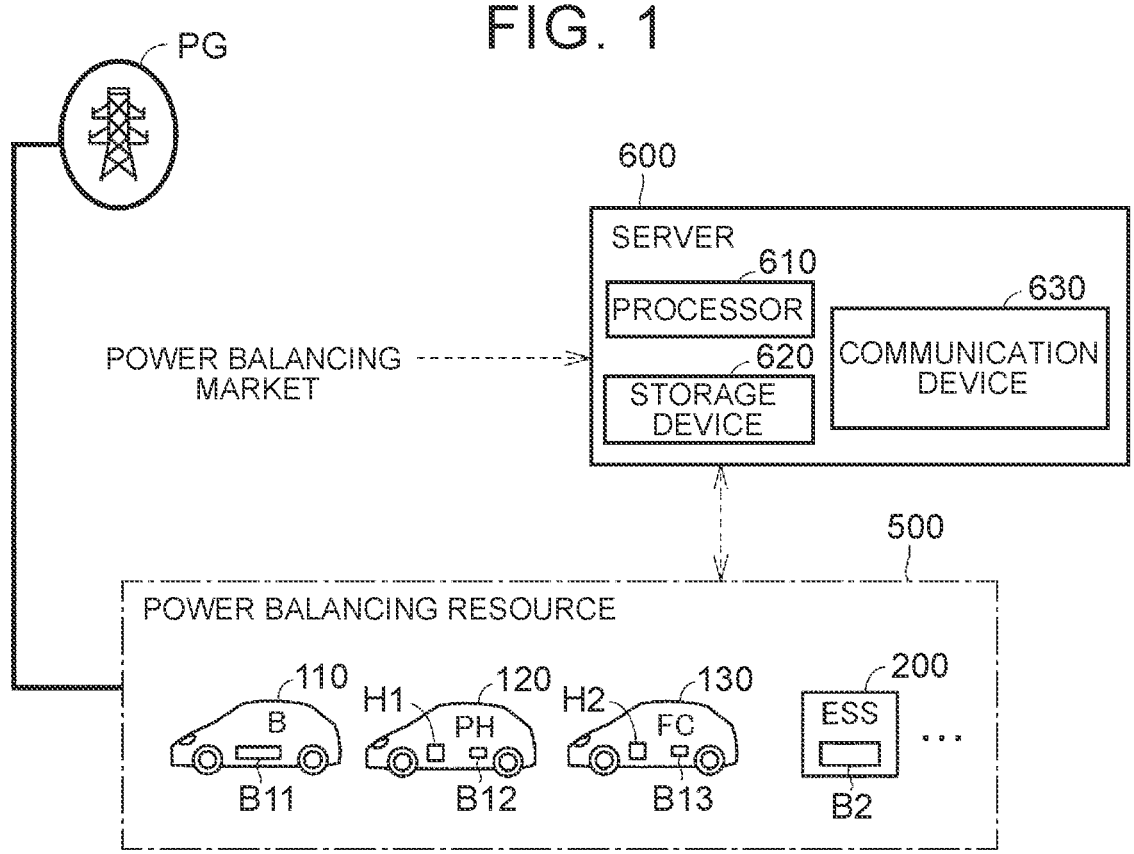
FIG. 1 is a diagram showing a schematic configuration of a control system according to the present embodiment of the present disclosure.

An embodiment of the present disclosure will be described in detail with reference to the drawings. In the drawings, the same or corresponding parts are denoted by the same reference signs and the description thereof will not be repeated.

FIG. 1 is a diagram showing a schematic configuration of a control system according to the present embodiment of the present disclosure. With reference to FIG. 1, the control system according to the present embodiment includes a resource group 500 and a server 600.

The server 600 manages the resource group 500. The resource group 500 includes a plurality of power balancing resources, each including a power storage device. In the present embodiment, the resource group 500 includes a battery electric vehicle (BEV) 110, a plug-in hybrid electric vehicle (PHEV) 120, a fuel cell electric vehicle (FCEV) 130, and an energy storage system (ESS) 200. Although the details will be described later, each of the BEV 110, the PHEV 120, the FCEV 130, and the ESS 200 functions as a power balancing resource for conducting power balancing of a power system PG.

The BEV 110, the PHEV 120, the FCEV 130, and the ESS 200 include batteries B11, B12, B13, and B2, respectively. Each of the batteries B11, B12, B13, and B2 is a power storage device configured to be chargeable and dischargeable. As each of the batteries B11, B12, and B13, a known vehicle power storage device (for example, a liquid secondary battery, an all-solid-state secondary battery, or an assembled battery) can be adopted. Examples of a vehicle secondary battery include a lithium ion battery and a nickel-metal hydride battery. As the battery B2, a known energy storage system (for example, a lithium ion battery, a lead storage battery, a nickel hydrogen battery, a redox flow battery, or a sodium-sulfur (NAS) battery) can be adopted.

Each of the BEV 110, the PHEV 120, and the FCEV 130 is an electrified vehicle (xEV) configured to travel using the electric power stored in the power storage device. Specifically, each of the electrified vehicles supplies the electric power from the power storage device to an electric motor (not shown) and travel by the power generated by the electric motor. An energy storage device for traveling included in the BEV 110 is only the battery B11. On the other hand, each of the PHEV 120 and the FCEV 130 includes an energy storage device for traveling in addition to the power storage device (battery B12 or B13).

The PHEV 120 includes a power source H1 for traveling. The power source H1 includes an internal combustion engine and a fuel tank that supplies fuel to the internal combustion engine. The PHEV 120 can travel by power output from the internal combustion engine without using the electric power. The fuel tank corresponds to the energy storage device for traveling.

The FCEV 130 includes an electric power source H2 for traveling. The electric power source H2 includes a fuel cell and a hydrogen tank that supplies hydrogen to the fuel cell. In the electric power source H2, hydrogen supplied to an anode of the fuel cell and oxygen (air) supplied to a cathode of the fuel cell cause an electrochemical reaction to generate electric power. The electric power generated by the electric power source H2 is supplied to the battery B13. The fuel tank corresponds to the energy storage device for traveling. Examples of the fuel cell include a polymer electrolyte fuel cell (PEFC), a pheosphoric acid fuel cell (PAFC), a molten carbonate fuel cell (MCFC), and a solid oxide fuel cell (SOFC).

Although the details will be described later, each of the batteries B11. B12, B13, and B2 is configured to be electrically connectable to the power system PG. In the present embodiment, balancing power of the power system PG is traded in a power balancing market. The balancing power of the power system PG is traded by, for example, a bidding method. The power system PG is a power grid constructed by a power plant and a power transmission and distribution facility (not shown). In the present embodiment, an electric power company maintains and manages the power system PG (commercial power system). The electric power company corresponds to a general power transmission and distribution business operator, and also serves as a power generation business operator and a power transmission and distribution business operator. The power system PG supplies alternate current (AC) power (for example, three-phase AC power). The power system PG according to the present embodiment corresponds to an example of the "external electric power source" according to the present disclosure.

The server 600 selects one or more control targets to be used for power balancing of the power system PG from the resource group 500, and causes the selected one or more control targets to function as the balancing power of the power system PG. Specifically, the server 600 controls one or more control targets so as to cause the power storage device to charge or discharge for power balancing of the power system PG. The server 600 according to the present embodiment corresponds to an example of a "computer" according to the present disclosure. Hereinafter, each of the BEV 110, the PHEV 120, and the FCEV 130 will be referred to as an "xEV 100", and each of the batteries B11, B12, and B13 will be referred to as a "battery B1", except for the case where the components are described separately.

Figure 2:
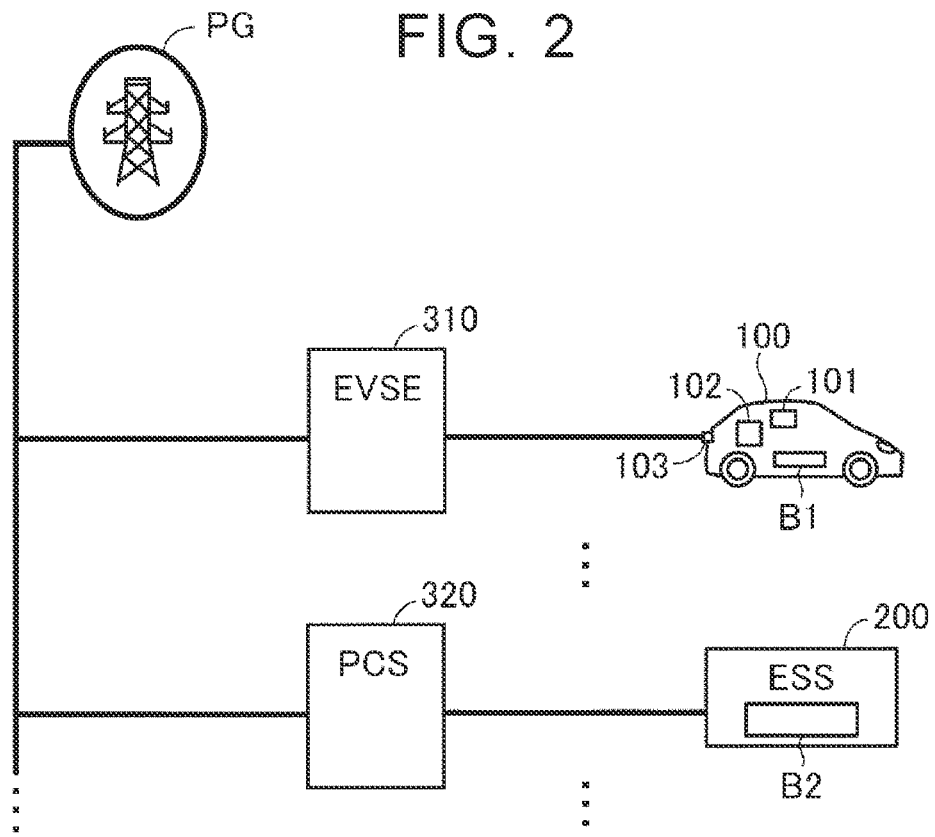
FIG. 2 is a diagram showing a state of a power balancing resource when power balancing of an external electric power source is conducted in the control system shown in FIG. 1.

FIG. 2 is a diagram showing each state of the xEV 100 and the ESS 200 when power balancing of the power system PG is conducted.

With reference FIG. 2 as well as FIG. 1, the xEV 100 includes an electronic control unit (ECU) 101, a charger-discharger 102, and an inlet 103. The xEV 100 conducts power balancing of the power system PG in a state where the xEV 100 is electrically connected to the power system PG via electric vehicle supply equipment (EVSE) 310. A plug of the EVSE 310 (for example, a plug provided at the tip of a charging cable connected to the main body of the EVSE 310) is connected to the inlet 103 of the xEV 100 such that the xEV 100 and the power system PG are electrically connected to each other. Hereinafter, the state in which the xEV 100 and the power system PG are electrically connected to each other will be referred to as an "xEV connection state".

The charger-discharger 102 is located between the inlet 103 and the battery B1 and is controlled by the ECU 101. When the electric power is output from the xEV 100 to the power system PG, the ECU 101 controls the charger-discharger 102 such that appropriate electric power is output from the battery B1 to the inlet 103 in the xEV connection state. Further, when the xEV 100 stores the electric power supplied from the power system PG, the ECU 101 controls the charger-discharger 102 such that appropriate electric power is input from the inlet 103 to the battery B1 in the xEV connection state.

In the xEV connection state, the xEV 100 communicates with the server 600 via the EVSE 310. The server 600 and the EVSE 310 may communicate with each other via the Internet. The server 600 can control the charger-discharger 102 by transmitting a command to the xEV 100 via the EVSE 310. That is, the server 600 can cause the battery B1 to charge or discharge for power balancing of the power system PG by remote control.

Note that, the xEV 100 may be a personally owned vehicle (POV), or a mobility as a service (MaaS) vehicle. The MaaS vehicle is a vehicle managed by a MaaS service provider. Further, the xEV 100 may be configured to include a wireless communication instrument (for example, data communication module (DCM)) that can access a mobile communication network (telematics), and to wirelessly communicate with the server 600 via the mobile communication network without intervening the EVSE. The xEV 100 may receive a command or a notification from the server 600 via the wireless communication instrument.

A power conditioning system (PCS) 320 is provided between the ESS 200 and the power system PG. The PCS 320 is configured to be communicable with the server 600. The server 600 and the PCS 320 may communicate with each other via the Internet. The PCS 320 includes an operation control device, a protection device, and a power conversion circuit (none of which are shown). The PCS 320 switches electrical connection and disconnection between the ESS 200 and the power system PG in accordance with a request from the server 600. Hereinafter, a state in which the ESS 200 and the power system PG are electrically connected to each other will be referred to as an "ESS connection state".

In the ESS connection state above, the battery B2 of the ESS 200 is electrically connected to the power system PG via the power conversion circuit of the PCS 320. In the PCS 320, the operation control device controls the power conversion circuit in accordance with a command from the server 600. The server 600 can control charging and discharging of the battery B2 by transmitting a charge-discharge command to the PCS 320. That is, the server 600 can cause the battery B2 to charge or discharge for power balancing of the power system PG by remote control. Specifically, when the electric power is output from the ESS 200 to the power system PG, the power conversion circuit of the PCS 320 is controlled such that the appropriate electric power is output from the battery B2 to the power system PG via the PCS 320 in the ESS connection state above. Further, when the ESS 200 stores the electric power supplied from the power system PG, the power conversion circuit of the PCS 320 is controlled such that appropriate electric power is input from the power system PG to the battery B2 via the PCS 320 in the ESS connection state above.

Each of the charger-discharger 102 of the xEV 100 and the power conversion circuit of the PCS 320 includes, for example, a bidirectional inverter and a bidirectional direct current (DC)/DC converter. The bidirectional inverter converts the DC power input from the power storage device side into AC power and outputs the AC power to the power system PG side, converts the AC power input from the power system PG side into DC power, and outputs the DC power to the power storage device side. The bidirectional DC/DC converter transforms the input DC power and outputs the transformed DC power. Note that, the configuration of the circuit for adjusting the input and output electric power of the power storage device is not limited to the above, and can be appropriately changed.

Although not shown in FIG. 2, each of the EVSE 310 and the PCS 320 includes a power sensor (for example, a voltage sensor and a current sensor) that detects a system frequency (power frequency of the power system PG). However, the configuration is not limited to the configuration above, and the power sensor may be mounted on at least one of the xEV 100 and the ESS 200. Further, the function of the charger-discharger 102 of the xEV 100 may be mounted on the EVSE 310. The function of the power conversion circuit of the PCS 320 may be mounted on the ESS 200. Further, a control device that executes charge-discharge control of the power storage device may be mounted on at least one of the EVSE 310 and the ESS 200. At least one of the xEV 100 and the ESS 200 may communicate directly with the server 600. Further, the power system PG is not limited to a large-scale AC grid provided by the electric power company, and may be a micro grid or a DC grid.

The server 600 is configured to manage a plurality of sets of EVSE 310 and a plurality of the PCSs 320 provided in a predetermined area. The server 600 may be a computer belonging to an aggregator. The aggregator is an electricity provider that provides the energy management service by bundling a plurality of distributed energy resources (hereinafter also referred to as "distributed energy resources (DERs)"). Each of the xEV 100 and the ESS 200 can function as a DER. The server 600 may cause multiple DERs to function as virtual power plants (VPPs) by remotely and integratedly controlling the DERs. The VPP is a mechanism that bundles a large number of DERs by advanced energy management technology using Internet of Things (IoT) and causes the DERs to function as if the DERs serve as a single power plant by remotely and integratedly controlling the DERs. Further, the server 600 may perform a demand response (DR) for each DER.

As shown in FIG. 1, the server 600 includes a processor 610, a storage device 620, and a communication device 630. The processor 610 may be a central processing unit (CPU). The storage device 620 is configured to be able to store various types of information. The communication device 630 includes various communication interfaces (I/Fs). The server 600 is configured to communicate with the outside through the communication device 630.

In addition to the program executed by the processor 610, the storage device 620 stores information used in the program (for example, maps, mathematical formulas, and various parameters). In the present embodiment, as the processor 610 executes the program stored in the storage device 620, various controls in the server 600 are executed. However, execution of the various types of processing in the server 600 is not limited to execution by software, and the processing can be executed by dedicated hardware (electronic circuit). The number of processors included in the server 600 is arbitrary, and may be one or more.

The server 600 is configured to classify the power storage devices of the respective power balancing resources included in the resource group 500 into any of a large-capacity power storage device or a small-capacity power storage device having a smaller full charge capacity than that of the large-capacity power storage device, and store a classification result thereof (hereinafter also referred to as a "first classification result") in the storage device 620. However, when the server 600 cannot acquire the information necessary for performing the above classification, the first classification result is unknown.

The server 600 is configured to classify the power storage devices of the respective power balancing resources included in the resource group 500 into any of a high-temperature operating power storage device that is less prone to deteriorate by charging and discharging at a high temperature, or a low-temperature operating power storage device that is prone to deteriorate by charging and discharging at a high temperature, and store a classification result thereof (hereinafter also referred to as a "second classification result") in the storage device 620. However, when the server 600 cannot acquire the information necessary for performing the above classification, the second classification result is unknown.

Figure 3:
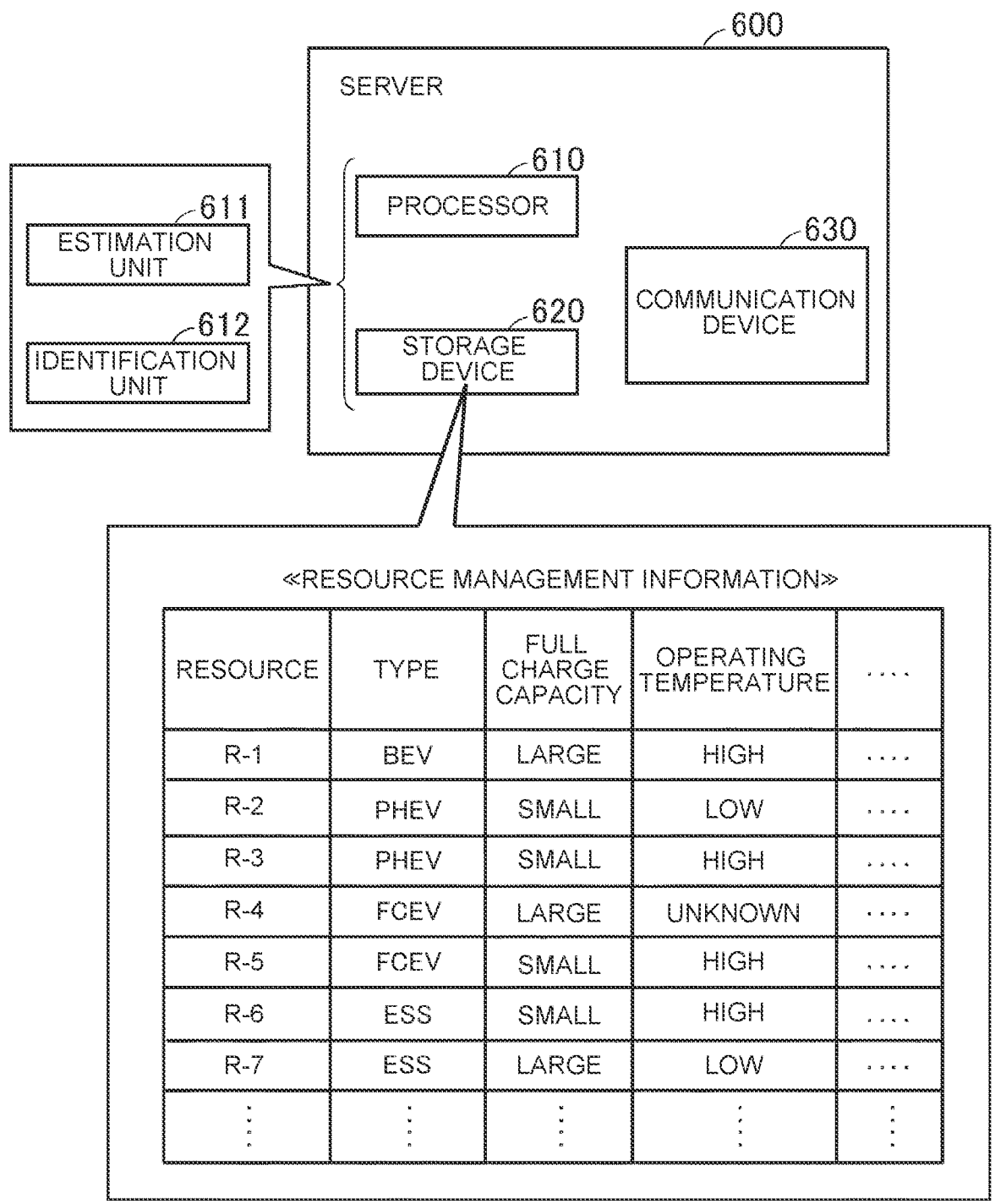
FIG. 3 is a diagram showing an example of resource management information showing a first classification result and a second classification result.

FIG. 3 is a diagram showing an example of resource management information showing the first classification result and the second classification result. With reference to FIG. 3, the resource management information is distinguished by identification information (ID) for each power balancing resource and stored in the storage device 620 of the server 600. The resource management information is stored in the storage device 620 of the server 600 by processes shown in FIGS. 4 to 6 that will be described later. The resource management information includes information indicating the type of the power balancing resource (BEV/PHEV/FCEV/ESS) and information indicating whether the full charge capacity of the power storage device included in the power balancing resource is small or large (that is, the first classification result), and information indicating whether the operating region of the power storage device included in the power balancing resource is a low temperature or a high temperature (that is, information indicating the second classification result). The ID of the power balancing resource may be a unique number assigned to each power balancing resource, or may be a communication address of the power balancing resource. In the present embodiment, the fact that the operating region of the power storage device is a low temperature means that the power storage device is prone to deteriorate by charging and discharging at a high temperature, and the fact that the operating region of the power storage device is a high temperature means that the power storage device is less prone to deteriorate by charging and discharging at a high temperature.

In the present embodiment, the server 600 includes an estimation unit 611 and an identification unit 612 that will be described below. The estimation unit 611 and the identification unit 612 are embodied by, for example, the processor 610 and a program executed by the processor 610.

Figure 5:
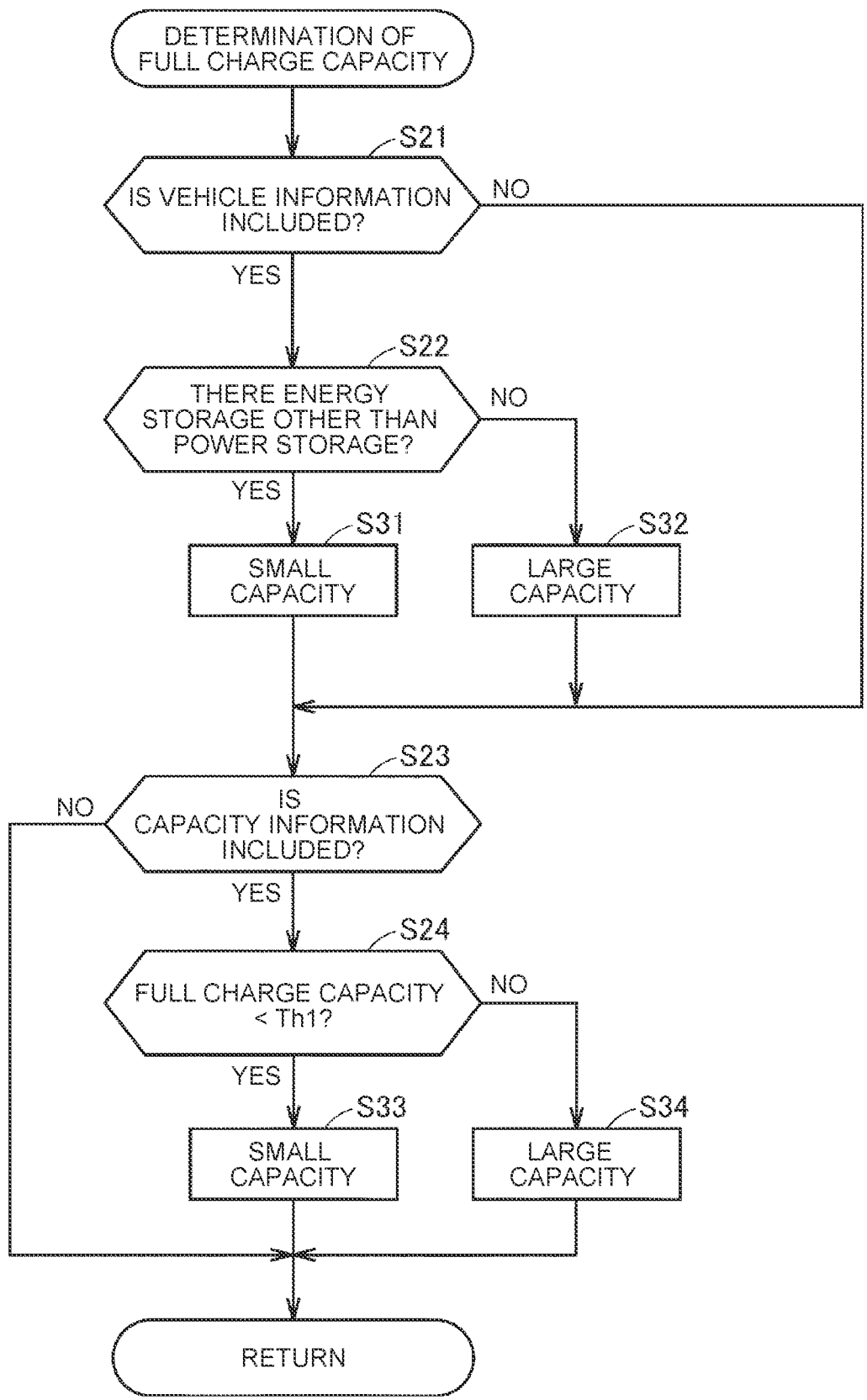
FIG. 5 is a flowchart showing details of a process related to first classification shown in FIG. 4.

The estimation unit 611 (second estimation unit) is configured to acquire vehicle information (second vehicle information) indicating whether the xEV 100 includes the energy storage device for traveling in addition to the battery B1, and estimate that the battery B1 is a large-capacity power storage device when the xEV 100 does not include the energy storage device for traveling in addition to the battery B1 and estimate that the battery B1 is a small-capacity power storage device when the xEV 100 includes the energy storage device for traveling in addition to the battery B1 (refer to S21, S22, S31, and S32 in FIG. 5 that will be described later).

The identification unit 612 is configured to acquire capacity information indicating the full charge capacity of the power storage device included in the power balancing resource, and determine whether the power storage device of the corresponding power balancing resource is a large-capacity power storage device or a small-capacity power storage device using the capacity information (refer to S23. S24, S33, and S34 in FIG. 5 that will be described later).

Although the details will be described later, the server 600 is configured to classify the battery B1 into any of a large-capacity power storage device and a small-capacity power storage device using the estimation result by the estimation unit 611 when the identification unit 612 cannot acquire the capacity information for the xEV 100 (NO in S23 in FIG. 5 that will be described later), and classify the battery B1 into any of a large-capacity power storage device and a small-capacity power storage device using the identification result by the identification unit 612 when the identification unit 612 can acquire the capacity information for the xEV 100 (YES in S23 in FIG. 5 that will be described later).

Figure 4:
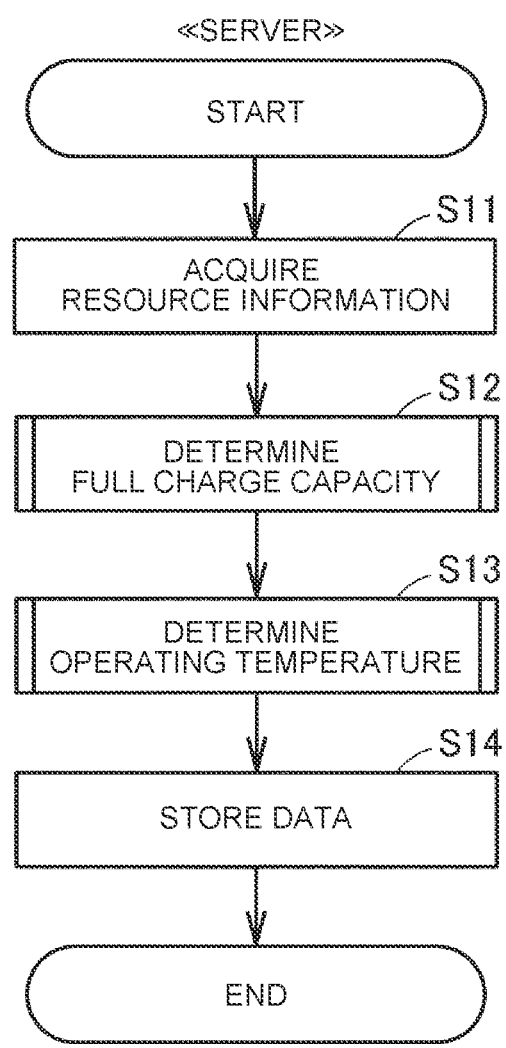
FIG. 4 is a flowchart showing a process related to classification of power balancing resources executed by a control computer (server) shown in FIG. 1.

FIG. 4 is a flowchart showing a process related to the classification of the power balancing resources executed by the server 600. The process shown in the flowchart is executed for each power balancing resource. Hereinafter, the power balancing resource that is subject to the process will be referred to as a "target resource". The server 600 executes the process shown in FIG. 4, for example, when a predetermined condition is satisfied. In the present embodiment, when the server 600 communicates with the power balancing resource (or the control device that controls charging and discharging of the power storage device included in the power balancing resource) for the first time, the server 600 executes the process shown in FIG. 4 that will be described below. For example, when the xEV 100 that uses the EVSE 310 managed by the server 600 for the first time communicates with the server 600 via the EVSE 310, the server 600 executes the process shown in FIG. 4. In this case, the xEV 100 (that is, any of the BEV 110, the PHEV 120, and the FCEV 130) corresponds to the target resource. Further, the server 600 may start management of the PCS 320 connected to the ESS 200 at the request of the owner of the ESS 200. Then, when starting management of the PCS 320, the server 600 may communicate with the PCS 320 for the first time and execute the process shown in FIG. 4. In this case, the ESS 200 corresponds to the target resource. Hereinafter, each step in the flowchart is simply represented by "S".

With reference to FIG. 4 as well as FIGS. 1 to 3, in S11, the server 600 acquires information related to the target resource (hereinafter referred to as "resource information").

When the target resource is the xEV 100, the server 600 communicates with the xEV 100 via, for example, the EVSE 310, and acquires the resource information from the xEV 100. In this case, the resource information includes vehicle information. The vehicle information indicates whether the target resource (electrified vehicle) is equipped with an energy storage device for traveling in addition to the power storage device. The vehicle information according to the present embodiment indicates whether the target resource is the BEV 110, the PHEV 120, or the FCEV 130. The fact that the target resource is the BEV 110 means that the target resource does not include the energy storage device for traveling in addition to the power storage device. On the other hand, the fact that the target resource is the PHEV 120 or the FCEV 130 means that the target resource includes the energy storage device for traveling in addition to the power storage device. The vehicle information above corresponds to an example of "second vehicle information" according to the present disclosure.

When the target resource is the ESS 200, the server 600 communicates with the PCS 320, for example, and acquires the resource information from the PCS 320. In this case, the resource information includes capacity information. The capacity information indicates the full charge capacity of the power storage device included in the target resource. In the capacity information, the full charge capacity of the power storage device may be indicated by a numerical value (ampere hour (Ah)), or may be indicated by a model of a known power storage device.

When the target resource is the ESS 200, the resource information may further include operating temperature information. The operating temperature information indicates whether the power storage device included in the target resource is prone to deteriorate by charging and discharging at a high temperature. Specifically, the operating temperature information indicates whether the power storage device included in the target resource is a high-temperature operating power storage device or a low-temperature operating power storage device. The high-temperature operating power storage device is less prone to deteriorate by charging and discharging at a high temperature, and the low-temperature operating power storage device is prone to deteriorate by charging and discharging at a high temperature.

Further, also when the target resource is the xEV 100, the resource information may include at least one of the above-mentioned capacity information and the above-mentioned operating temperature information in addition to the above-mentioned vehicle information. The method of managing information of the electrified vehicle differs depending on the automobile manufacturer. Therefore, the content of the resource information that the server 600 can acquire from the xEV 100 may differ for each electrified vehicle. However, the vehicle information (first vehicle information) is information indicating the basic structure of the electrified vehicle, and there is a high possibility that the server 600 can acquire the vehicle information from the electrified vehicle.

In the subsequent S12, the server 600 determines the full charge capacity of the power storage device included in the target resource. FIG. 5 is a flowchart showing the details of S12 in FIG. 4.

With reference to FIG. 5 as well as FIGS. 1 to 3, in S21, the server 600 determines whether the resource information acquired in S11 in FIG. 4 includes the vehicle information. When the resource information includes the vehicle information (YES in S21), in S22, the server 600 determines whether the target resource includes the energy storage device for traveling in addition to the power storage device in the target resource (electrified vehicle) based on the vehicle information. When the target resource includes the energy storage device for traveling in addition to the power storage device (YES in S22), the server 600 determines in S31 that the full charge capacity of the power storage device included in the target resource is small. On the other hand, when the target resource does not include the energy storage device for traveling in addition to the power storage device (NO in S22), the server 600 determines in S32 that the full charge capacity of the power storage device included in the target resource is large.

When the determination is made in any of S31 and S32, the process proceeds to S23. Also when the server 600 determines NO in S21, the process proceeds to S23. In S23, the server 600 determines whether the resource information acquired in S11 in FIG. 4 includes the capacity information. When the resource information includes the capacity information (YES in S23), in S24, the server 600 determines whether the full charge capacity of the power storage device included in the target resource is smaller than a predetermined value (hereinafter referred to as "Th1") based on the capacity information. When the full charge capacity of the power storage device included in the target resource is smaller than the Th1 (YES in S24), the server 600 determines in S33 that the full charge capacity of the power storage device included in the target resource is small. On the other hand, when the full charge capacity of the power storage device included in the target resource is equal to or larger than the Th1 (NO in S24), the server 600 determines in S34 that the full charge capacity of the power storage device included in the target resource is large. The determination in S33, S34 has priority over the determination in S31, S32. That is, when the determination result differs between S31, S32 and S33, S34, the determination result in S33, S34 becomes the final determination result.

When the determination is made in any of S33 and S34, the process proceeds to S13 in FIG. 4. Also when the server 600 determines NO in S23, the process proceeds to S13 in FIG. 4. When the server 600 determines NO in both S21 and S23, it is considered that the server 600 has not acquired the information necessary for determining the full charge capacity, and the full charge capacity of the power storage device included in the target resource (a first classification result) is unknown.

Figure 6:
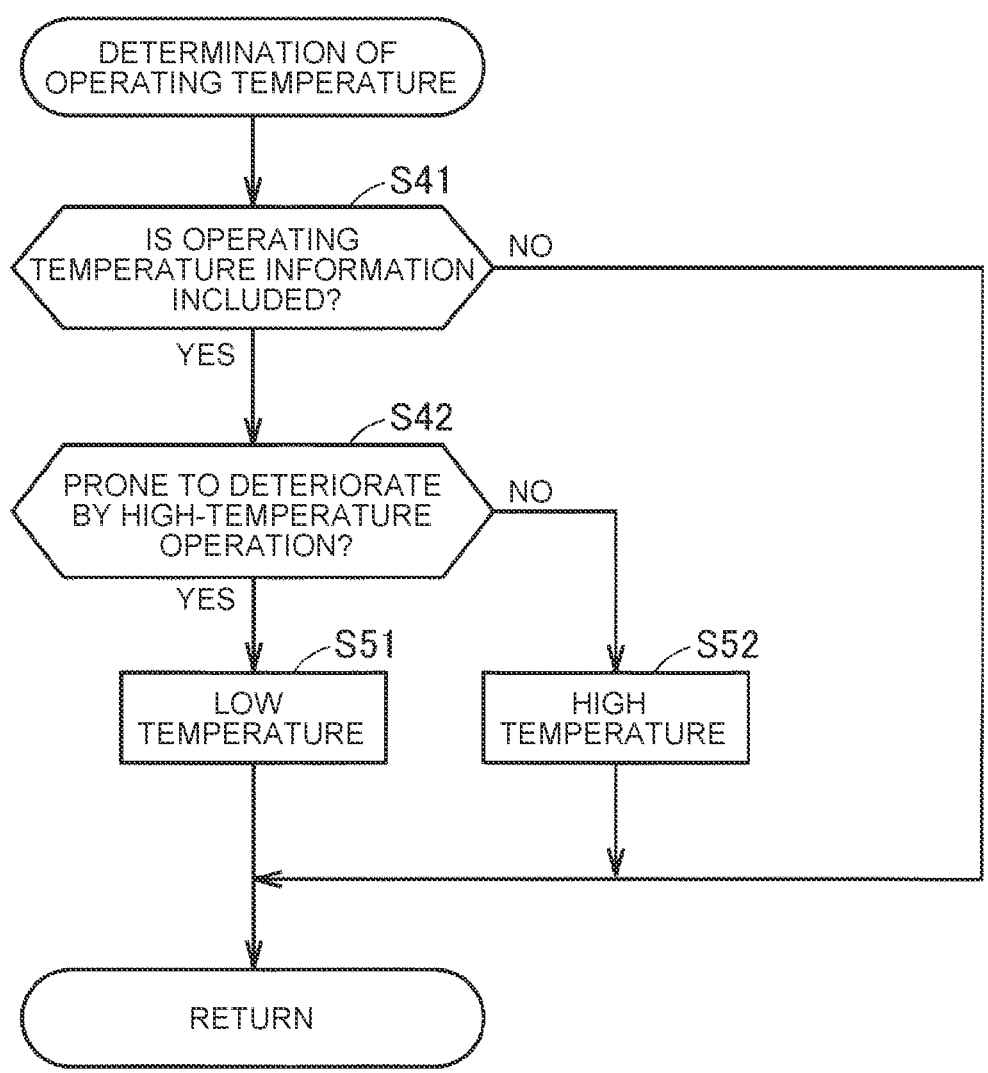
FIG. 6 is a flowchart showing details of a process related to second classification shown in FIG. 4.

With reference to FIG. 4 as well as FIGS. 1 to 3, in S13, the server 600 determines the operating temperature of the power storage device included in the target resource. FIG. 6 is a flowchart showing the details of S13 in FIG. 4.

With reference to FIG. 6 as well as FIGS. 1 to 3, in S41, the server 600 determines whether the resource information acquired in S11 in FIG. 4 includes the operating temperature information. When the resource information includes the operating temperature information (YES in S41), in S42, the server 600 determines whether the power storage device of the target resource is prone to deteriorate by charging and discharging at a high temperature based on the operating temperature information. When the power storage device of the target resource is prone to deteriorate by charging and discharging at a high temperature (YES in S42), the server 600 determines in S51 that the operating region of the power storage device included in the target resource is a low temperature. On the other hand, when the power storage device of the target resource is less prone to deteriorate by charging and discharging at a high temperature (NO in S42), the server 600 determines in S52 that the operating region of the power storage device included in the target resource is a high temperature.

When the determination is made in any of S51 and S52, the process proceeds to S14 in FIG. 4. Also when the server 600 determines NO in S41, the process proceeds to S14 in FIG. 4. When the server 600 determines NO in S41, it is considered that the server 600 has not acquired the information necessary for determining the operating temperature, and the operating temperature of the power storage device included in the target resource (a second classification result) is unknown.

With reference to FIG. 4 again as well as FIGS. 1 to 3, in S14, the server 600 stores, in the storage device 620, the respective determination results (the first classification result and the second classification result) in S12 and S13 in association with the identification information (ID) of the target resource. With the above, the data related to the target resource is added to the resource management information shown in FIG. 3. Further, the target resource is added to the resource group 500 managed by the server 600.

When the server 600 conducts power balancing of the power system PG, the server 600 selects one or more control targets to be used for the power balancing of the power system PG from the resource group 500 with reference to the resource management information shown in FIG. 3, and causes the selected one or more control targets to function as the balancing power of the power system PG.

FIG. 7 is a flowchart showing a process related to selection of a control target executed by the server 600.

With reference to FIG. 7 as well as FIGS. 1 to 3, in S71, the server 600 acquires the type and contents of power balancing. In the present embodiment, the server 600 acquires the type and contents of power balancing that the aggregator has made a successful bid for in the power balancing market. The aggregator may carry out electronic commerce using the server 600. In this case, the type and contents of the power balancing that has been successfully bid are recorded in the storage device 620. Therefore, the server 600 can acquire, in S71, the type and contents of power balancing that has been successfully bid from the storage device 620. However, the present disclosure is not limited to this, and a user may input the type and contents of power balancing to the server 600.

FIG. 8 is a diagram showing an example of the type and contents of power balancing. With reference to FIG. 8, in the present embodiment, power balancing A to power balancing J are traded in the power balancing market. The power balancing A to the power balancing J that are traded are all the balancing power of the power system PG (FIG. 1).

Each of the power balancing A and the power balancing B is frequency containment reserve (FCR) and is also referred to as "primary balancing power". For each of the power balancing A and the power balancing B, the response time is within 10 seconds and the duration is five minutes. The power balancing A and the power balancing B are executed by the local control by the control target. The power balancing A is an increase category (charge request), and the power balancing B is a decrease category (discharge request).

Each of the power balancing C and the power balancing D is synchronized frequency restoration reserve (S-FRR). Each of the power balancing E and the power balancing F is frequency restoration reserve (FRR). The power balancing C to the power balancing F are also collectively referred to as "secondary balancing power". For each of the power balancing C to the power balancing F, the response time is within five minutes and the duration is 30 minutes. Each of the power balancing C and the power balancing D is executed by the remote control on the control target by the server 600, and a load frequency control (LFC) signal is used in the remote control. Each of the power balancing E and the power balancing F is executed by the remote control on the control target by the server 600, and an economic load dispatching control (EDC) signal is used in the remote control. Each of the power balancing C and the power balancing E is the increase category (charge request), and each of the power balancing D and the power balancing F is the decrease category (discharge request).

Each of the power balancing G and the power balancing H is replacement reserve (RR). Each of the power balancing I and the power balancing J is replacement reserve for feed-in tariff (RR-FIT). The power balancing G and the power balancing J are also collectively referred to as "tertiary balancing power". For each of the power balancing G and the power balancing H, the response time is within 15 minutes and the duration is three hours. Each of the power balancing G and the power balancing H is executed by the remote control on the control target by the server 600, and the EDC signal is used in the remote control. For each of the power balancing I and the power balancing J, the response time is within 45 minutes and the duration is three hours. Each of the power balancing I and the power balancing J is executed by the remote control on the control target by the server 600. Each of the power balancing G and the power balancing I is the increase category (charge request), and each of the power balancing H and the power balancing J is the decrease category (discharge request).

Each of the primary balancing power and the secondary balancing power corresponds to an example of "power balancing for adjusting a frequency of the external electric power source" according to the present disclosure, and the tertiary balancing power corresponds to an example of "power balancing for balancing supply and demand of the external electric power source" according to the present disclosure.

Figure 9:
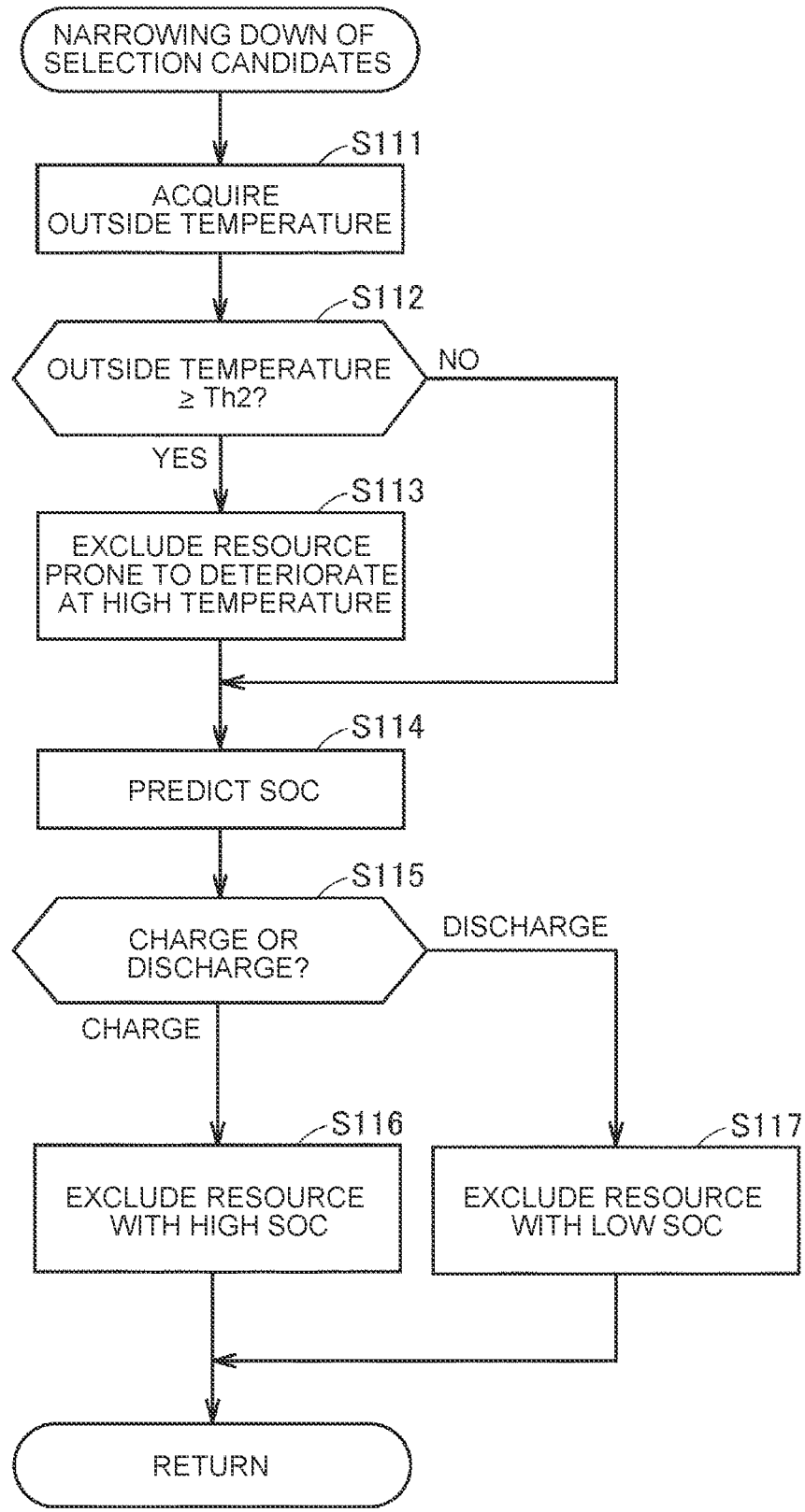
FIG. 9 is a flowchart showing details of a process related to narrowing down of selection candidates of the control target shown in FIG. 7.

With reference to FIG. 7 again as well as FIGS. 1 to 3, the server 600 acquires, in S71, the type of power balancing (any of the power balancing A to the power balancing J) and contents thereof shown in FIG. 8. The contents of power balancing includes the period of power balancing (start date and time and end date and time) in addition to the contents shown in FIG. 8 (command control, response time, duration, and charge/discharge). In the present embodiment, the control target is selected on the day before the day when the power balancing is conducted. However, the timing of selecting the control target can be changed as appropriate. In the subsequent S72, the server 600 narrows down selection candidates for the control target related to the power balancing. FIG. 9 is a flowchart showing the details of S72 in FIG. 7.

With reference to FIG. 9 as well as FIGS. 1 to 3, in S11, the server 600 acquires the outside air temperature when the power balancing is conducted (more specifically, in the middle of the power balancing). The server 600 may predict an average outside temperature in an area and a time slot in which the power balancing is conducted, using a known service that provides weather information (for example, a service provided by the Japan Meteorological Agency, an information technology (IT) company, or a telecommunications company). Alternatively, each power balancing resource included in the resource group 500 may include an outside air temperature sensor. The server 600 may predict an average outside temperature in an area and a time slot in which the power balancing is conducted, using the outside temperature detected by the outside air temperature sensor.

In S112, the server 600 determines whether the outside air temperature acquired in S11 (that is, the outside air temperature when the server 600 conducts the power balancing) is equal to or higher than a predetermined reference temperature (hereinafter referred to as a "Th2"). When the outside air temperature is equal to or higher than the Th2 (YES in S112), in S113, the server 600 excludes the power balancing resource provided with a low-temperature operating power storage device from the selection candidates for the control target related to the power balancing, with reference to the resource management information shown in FIG. 3. With the above, it becomes easy to avoid deterioration of the low-temperature operating power storage device caused by that the low-temperature operating power storage device is used in power balancing under a high-temperature environment.

When the outside air temperature acquired in S111 is less than the Th2 (NO in S112), the process proceeds to S114. In S114, the server 600 predicts the SOC of the power storage device of each power balancing resource included in the resource group 500 (however, excluding the power balancing resource excluded in S113) when the power balancing is conducted (more specifically, at the start of the power balancing).

When the power balancing resource is the xEV 100, the server 600 may acquire the current SOC of the battery B1 and a traveling plan of the xEV 100 (for example, traveling start time and traveling end time) from the xEV 100, and predict the SOC of the battery B1 when the power balancing is conducted, based on the information. When the traveling plan is not transmitted from the xEV 100 even though the server 600 requests the xEV 100 for transmitting the traveling plan, the server 600 may predict that the current SOC of the battery B1 is maintained until the start time of the power balancing.

When the power balancing resource is the ESS 200, the server 600 may acquire the current SOC of the battery B2 and a charge-discharge history of the ESS 200 from the PCS 320, and predict the SOC of the battery B2 when the power balancing is conducted, based on the information. When the PCS 320 transmits, to the server 600, a charge-discharge plan of the ESS 200 instead of the charge-discharge history of the ESS 200, the server 600 may predict the SOC of the battery B2 when the power balancing is conducted based on the current SOC of the battery B2 and the charge-discharge plan of the ESS 200.

In the subsequent S115, the server 600 determines whether the power balancing is the increase category (charge request) or the decrease category (discharge request) based on the type and contents of power balancing acquired in S71 in FIG. 7. Specifically, when the type of power balancing acquired in S71 in FIG. 7 is any of the power balancing A, the power balancing C, the power balancing E, the power balancing G, and the power balancing I (refer to FIG. 8), in S115, the power balancing is determined to be the "increase category (charge request)", and the process proceeds to S116.

In S116, the server 600 determines whether the power storage device can be charged with electric energy required for the power balancing, using the SOC of the power storage device predicted in S114. Specifically, when the SOC of the power storage device predicted in S114 is sufficiently low and the power storage device can be charged with the electric energy required for the power balancing, the server 600 determines that the power balancing can be conducted using the power storage device. On the other hand, when the SOC of the power storage device predicted in S114 is too high and the power storage device cannot be charged with the electric energy required for the power balancing, the server 600 determines that the power balancing cannot be conducted using the power storage device. The server 600 may estimate charging electric energy required for power balancing based on the type and duration of the power balancing.

The above determination in S116 is made for each power balancing resource. Then, the server 600 excludes the power balancing resource provided with the power storage device determined that the power balancing cannot be conducted from the selection candidates for the control target. With the above, it becomes easy to avoid that the power balancing resource that cannot meet the power balancing request is selected as the control target.

Specifically, when the type of power balancing acquired in S71 in FIG. 7 is any of the power balancing B, the power balancing D, the power balancing F, the power balancing H, and the power balancing J (refer to FIG. 8), in S115, the power balancing is determined to be the "decrease category (discharge request)", and the process proceeds to S117.

In S117, the server 600 determines whether the electric energy required for the power balancing can be discharged from the power storage device, using the SOC of the power storage device predicted in S114. Specifically, when the SOC of the power storage device predicted in S114 is sufficiently high and the electric energy required for the power balancing can be discharged from the power storage device, the server 600 determines that the power balancing can be conducted using the power storage device. On the other hand, when the SOC of the power storage device predicted in S114 is too low and the electric energy required for the power balancing cannot be discharged from the power storage device, the server 600 determines that the power balancing cannot be conducted using the power storage device. The server 600 may estimate discharging electric energy required for the power balancing based on the type and duration of the power balancing.

The above determination in S117 is made for each power balancing resource. Then, the server 600 excludes the power balancing resource including the power storage device determined that the power balancing cannot be conducted from the selection candidates for the control target. With the above, it becomes easy to avoid that the power balancing resource that cannot meet the power balancing request is selected as the control target.

Figure 10:
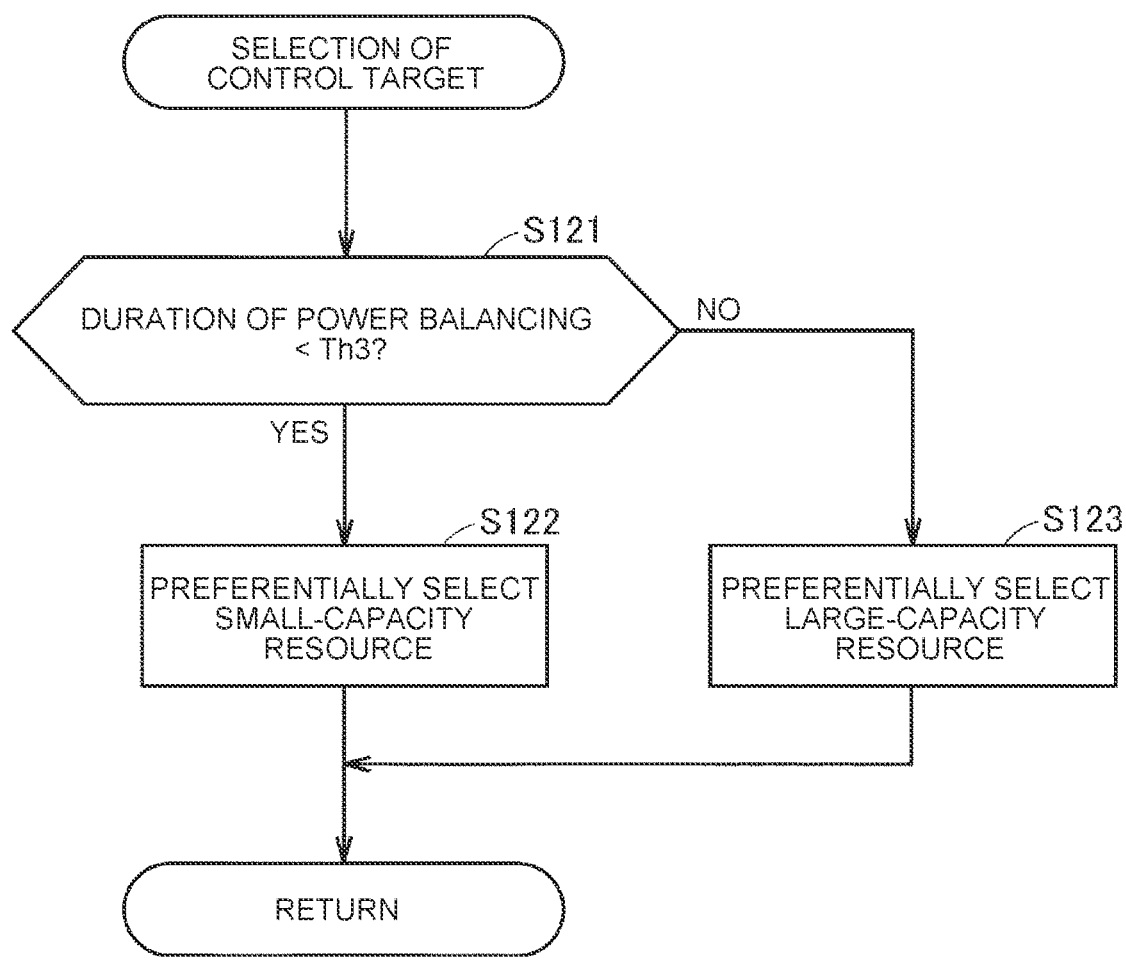
FIG. 10 is a flowchart showing details of a process related to selection of the control target shown in FIG. 7.

When the determination is made in any of S116 and S117, the process proceeds to S73 in FIG. 7. Refer to FIG. 7 again as well as FIGS. 1 to 3, and the process in S72 shown in FIG. 9 above is executed such that the server 600 excludes the power balancing resource that is not suitable for power balancing from the selection candidates for the control target before the power balancing is conducted. Then, in the subsequent S73, the server 600 selects the control target from the selection candidates for the control target narrowed down in S72. The number of control targets selected in S73 may be one or more. FIG. 10 is a flowchart showing the details of S73 in FIG. 7.

With reference to FIG. 10 as well as FIGS. 1 to 3, in S121, the server 600 determines whether the duration of the power balancing is shorter than a predetermined time (hereinafter will be referred to as a "Th3") based on the type and contents of power balancing acquired in S71 in FIG. 7. When the duration of the power balancing is shorter than the Th3 (YES in S121), the process proceeds to S122, and when the duration is equal to or longer than the Th3 (NO in S121), the process proceeds to S123. In the present embodiment, when the duration of the power balancing matches the Th3, the server 600 determines NO in S121. However, the present disclosure is not limited to this, and when the duration of the power balancing matches the Th3, the server 600 may determine YES in S121.

In the present embodiment, the Th3 is set to one hour. Therefore, when the type of power balancing acquired in S71 in FIG. 7 is any of the power balancing A to the power balancing F (refer to FIG. 8), the server 600 determines YES in S121. On the other hand, when the type of power balancing acquired in S71 in FIG. 7 is any of the power balancing G to the power balancing J (refer to FIG. 8), the server 600 determines NO in S121. However, the Th3 is not limited to one hour and can be changed as appropriate. The Th3 may be set to a time shorter than one hour (for example, 30 minutes) or a time longer than one hour (for example, three hours).

In S122, the server 600 preferentially selects the power balancing resource provided with a small-capacity power storage device as the control target from the selection candidates for the control target with reference to the resource management information shown in FIG. 3. When the multiple small-capacity resources (that is, power balancing resources each including a small-capacity power storage device) are included in the selection candidates for the control target, the server 600 may select the number of control targets required for the power balancing from the small-capacity resources based on at least one of the full charge capacity or the SOC of the power storage device.

For example, the server 600 may preferentially select the power balancing resource in which the full charge capacity of the power storage device is clarified by the capacity information from the small-capacity resources. Specifically, the server 600 may select the power balancing resources as the control targets from the small-capacity resources in ascending order of full charge capacity of the power storage device.

When the power balancing is the increase category (charge request), the server 600 may preferentially select the power balancing resource in which the SOC of the power storage device is low from the small-capacity resources as the control target. Further, when the power balancing is the decrease category (discharge request), the server 600 may preferentially select the power balancing resource in which the SOC of the power storage device is high from the small-capacity resources as the control target.

However, the present disclosure is not limited to the above, and the control target may be randomly selected from the small-capacity resources. In S122, when the number of small-capacity resources is sufficient for the number of control targets required for the power balancing, the server 600 selects only the small-capacity resources as the control targets. However, in S122, when the number of small-capacity resources is insufficient for the number of control targets required for the power balancing, the server 600 may preferentially select the power balancing resource from the selection candidates for the control target other than the small-capacity resources to cover the shortfall.

In S123, the server 600 preferentially selects the power balancing resource provided with a large-capacity power storage device as the control target from the selection candidates for the control target with reference to the resource management information shown in FIG. 3. When the multiple large-capacity resources (that is, power balancing resources each including a large-capacity power storage device) are included in the selection candidates for the control target, the server 600 may select the number of control targets required for the power balancing from the large-capacity resources based on at least one of the full charge capacity or the SOC of the power storage device.

For example, the server 600 may preferentially select the power balancing resource in which the full charge capacity of the power storage device is clarified by the capacity information from the large-capacity resources. Specifically, the server 600 may select the power balancing resources as the control targets from the large-capacity resources in descending order of full charge capacity of the power storage device.

When the power balancing is the increase category (charge request), the server 600 may preferentially select the power balancing resource in which the SOC of the power storage device is low from the large-capacity resources as the control target. Further, when the power balancing is the decrease category (discharge request), the server 600 may preferentially select the power balancing resource in which the SOC of the power storage device is high from the large-capacity resources as the control target.

However, the present disclosure is not limited to the above, and the control target may be randomly selected from the large-capacity resources. In S123, when the number of large-capacity resources is sufficient for the number of control targets required for the power balancing, the server 600 selects only the large-capacity resources as the control targets. However, in S123, when the number of large-capacity resources is insufficient for the number of control targets required for the power balancing, the server 600 may preferentially select the power balancing resource from the selection candidates for the control target other than the large-capacity resources to cover the shortfall.

When the number of control targets required for the power balancing are selected from the selection candidates for the control targets by executing the process in S122 or S123, the process proceeds to S74 in FIG. 7. With reference to FIG. 7 as well as FIGS. 1 to 3, in S74, the server 600 transmits a notification to one or more selected control targets. This notification includes the type and contents of power balancing acquired in S71 in FIG. 7.

When the selected control target is the xEV 100, the EVSE 310 connected to the xEV 100 is also handled as the control target. In S74, the server 600 transmits the notification to the xEV 100 via the EVSE 310. When the selected control target is the ESS 200, the PCS 320 connected to the ESS 200 is also handled as the control target. In S74, the server 600 transmits the notification to the PCS 320. At least one of the xEV 100 and the PCS 320 may transfer the notification received from the server 600 to a mobile terminal (smartphone, wearable device, etc.) carried by the user. When the user of the control target rejects the power balancing in response to the above notification (for example, when the server 600 receives a reply indicating a refusal to the above notification), the server 600 may exclude the control target from the selection candidates and select a new control target by executing the process shown in FIG. 7.

Figure 11:
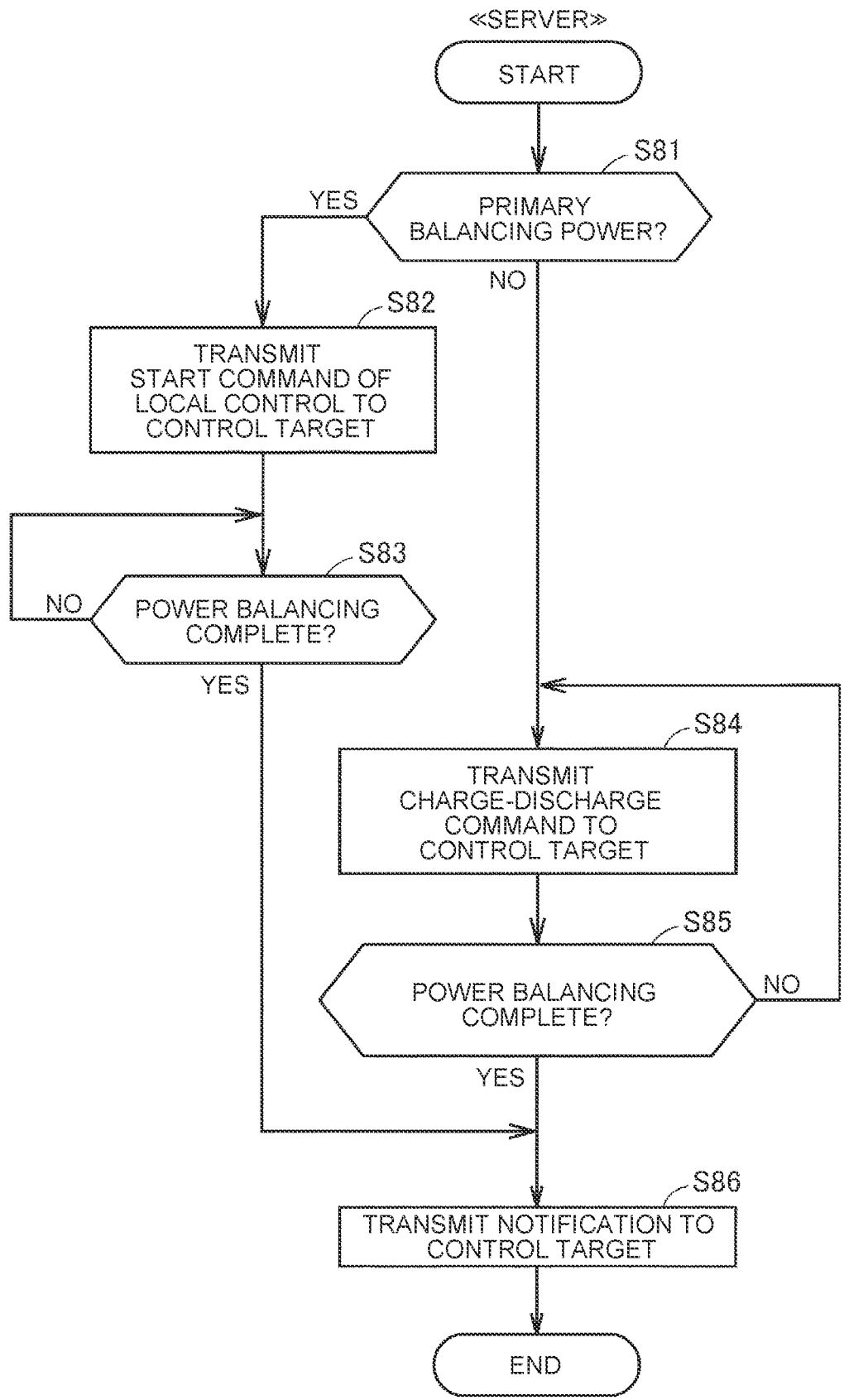
FIG. 11 is a flowchart showing a process related to power balancing executed by the control computer (server) shown in FIG. 1.

FIG. 11 is a flowchart showing a process related to power balancing executed by the server 600. The process shown in this flowchart is started when the current time reaches the start time of power balancing after the control target related to the power balancing is selected by the process shown in FIG. 7. A series of processes shown in FIG. 11 is executed for each selected control target.

With reference to FIG. 11 as well as FIGS. 1 to 3, in S81, the server 600 determines whether the power balancing is the primary balancing power based on the type and contents of power balancing acquired in S71 in FIG. 7. When the type of power balancing is the power balancing A or the power balancing B (refer to FIG. 8), the server 600 determines YES in S81, and the process proceeds to S82. In S82, the server 600 transmits a start command of the local control to the control target. When the control target is the xEV 100, the start command is transmitted to the xEV 100 via the EVSE 310. When the control target is the ESS 200, the start command is transmitted to the PCS 320 (see FIG. 2). The start command starts the local control in the control target. With the local control, the control target functions as the primary balancing power. After that, the server 600 determines in S83 whether the current time is the end time of the power balancing. Then, when the current time reaches the end time of the power balancing (YES in S83), the server 600 transmits a notification (hereinafter also referred to as a "completion notification") indicating that the power balancing is completed to the control target in S86.

When the type of power balancing is any of the power balancing C to the power balancing J (refer to FIG. 8), the server 600 determines NO in S81, and the process proceeds to S84. In S84, the server 600 transmits, to the control target, a charge-discharge command (a charge command or a discharge command) in accordance with the type of power balancing. When the control target is the xEV 100, the charge-discharge command is transmitted to the xEV 100 via the EVSE 310. When the control target is the ESS 200, the charge-discharge command is transmitted to the PCS 320 (refer to FIG. 2). The server 600 remotely controls the control target based on the charge-discharge command.

After that, the server 600 determines in S85 whether the current time is the end time of the power balancing. The transmission of the charge-discharge command (S84) is continuously executed until the current time reaches the end time of the power balancing. Then, when the current time reaches the end time of the power balancing (YES in S85), the server 600 transmits the above-mentioned completion notification to the control target in S86.

Figure 12:
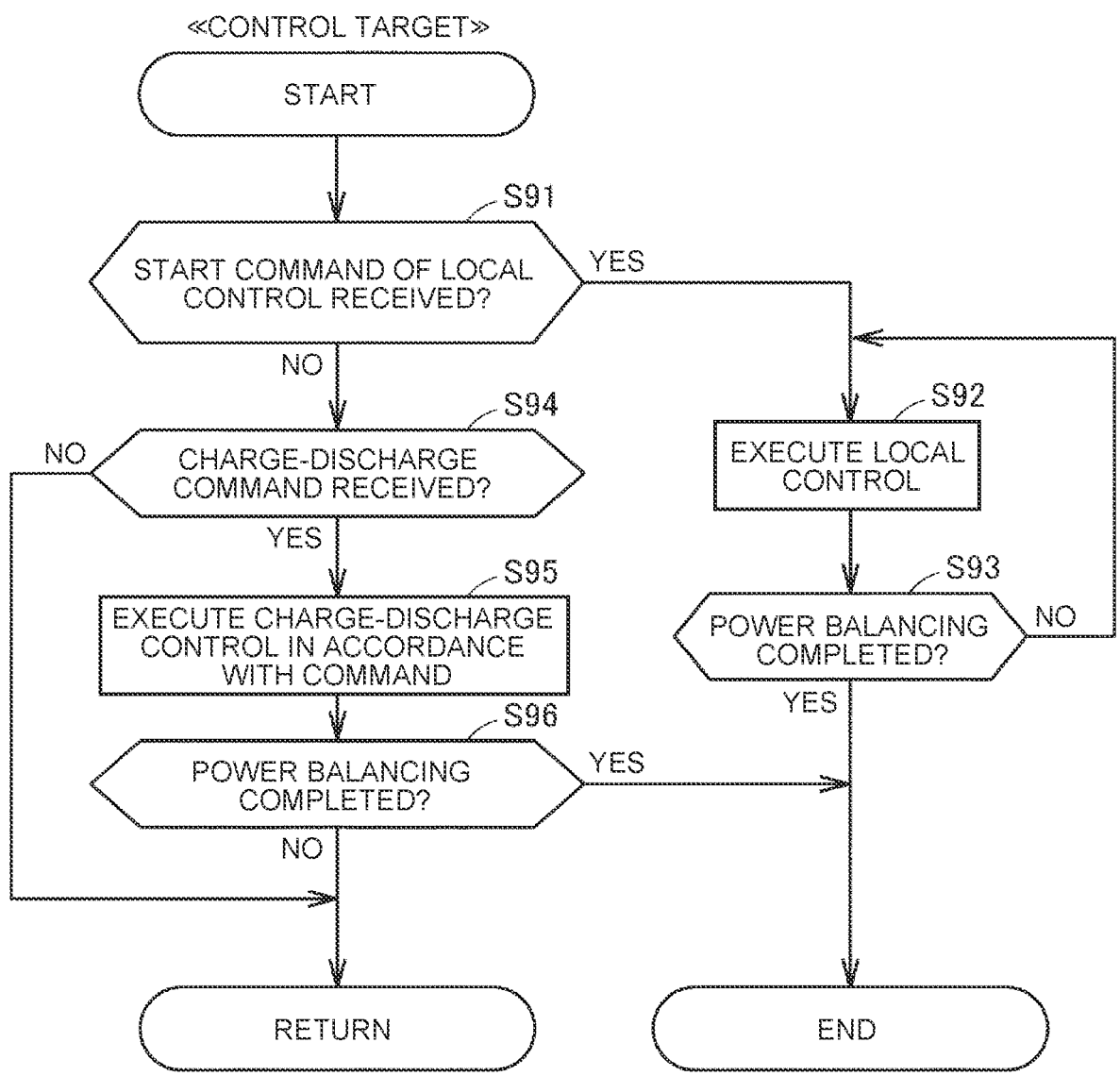
FIG. 12 is a flowchart showing a process related to power balancing executed by the control target selected by the process shown in FIG. 7.

FIG. 12 is a flowchart showing a process related to power balancing executed by the control target. The process shown in this flowchart is started when the control target selected in the process shown in FIG. 7 is electrically connected to the power system PG, repeatedly executed during the period for which the power balancing is not completed, and ends when the power balancing is completed.

A series of processes shown in FIG. 12 is executed for each selected control target. When the control target is the xEV 100, the ECU 101 (for example, a computer) executes the processes. When the control target is the ESS 200, the operation control device (for example, a computer) of the PCS 320 executes the processes. Specifically, in the computer, when a processor executes a program stored in a storage device, the series of processes shown in FIG. 12 described below is executed.

With reference to FIG. 12 as well as FIGS. 1 to 3, in S91, the processor determines whether the control target receives the start command of the local control (S82 in FIG. 11) from the server 600. When the control target receives the start command of the local control (YES in S91), the control target starts the local control (governor-free operation) in S92. Specifically, the control target executes charging or discharging of the power storage device (that is, charging or discharging for the power balancing) in accordance with the type of power balancing (primary balancing power) in the local control while detecting the power frequency of the power system PG using the power sensor. In the subsequent S93, the processor determines whether the control target receives the completion notification (S86 in FIG. 11) from the server 600. The local control (S92) is continuously executed until the control target receives the completion notification. Then, when the control target receives the completion notification (YES in S93), the series of processes shown in FIG. 12 ends.

When the processor determines NO in S91, the process proceeds to S94. In S94, the processor determines whether the control target receives the charge-discharge command (S84 in FIG. 11) from the server 600. When the control target has not received the charge-discharge command (NO in S94), the process returns to the first step (S91). On the other hand, when the control target receives the charge-discharge command (YES in S94), the control target executes charging or discharging of the power storage device (that is, charging or discharging for the power balancing) in S95 in accordance with the charge-discharge command. In the subsequent S96, the processor determines whether the control target receives the completion notification (S86 in FIG. 11) from the server 600. When the control target has not received the completion notification (NO in S96), the process returns to the first step (S91). The remote control (S95) of the control target executed by the server 600 is continuously executed until the control target receives the completion notification. Then, when the control target receives the completion notification (YES in S96), the series of processes shown in FIG. 12 ends.

As described above, the power balancing method according to the present embodiment includes a classification process (FIGS. 4 to 6), a selection process (FIGS. 7 to 10), and a control process (FIG. 11). In the classification process, the server 600 classifies the power storage device of each power balancing resource included in the resource group 500 into any of a large-capacity power storage device or a small-capacity power storage device (refer to FIGS. 3 and 5). In the selection process, when the server 600 selects one or more control targets to be used for power balancing of the power system PG (external electric power source) from the multiple power balancing resources, the server 600 preferentially selects the power balancing resource provided with a small-capacity power storage device as the control target for power balancing of which duration is shorter than the Th3, and preferentially selects a large-capacity power storage device as the control target for power balancing of which duration is longer than the Th3 (refer to FIG. 10). In the control process, the server 600 controls one or more control targets so as to cause the power storage device to charge or discharge for power balancing (refer to FIG. 11).

According to the above power balancing method, when the power balancing is conducted by the control target selected from the multiple power balancing resources, an appropriate power balancing resource can be selected in accordance with the type of power balancing.

The type of power balancing resource included in the resource group 500 shown in FIG. 1 can be changed as appropriate. For example, the resource group 500 may not include an energy storage system (ESS). The server 600 may manage only the electrified vehicles and conduct power balancing of the external electric power source only by the electrified vehicles. Further, the server 600 may manage only the BEVs and the PHEVs, and may conduct power balancing of the external electric power source only by the BEVs and the PHEVs. In a mode in which the resource group 500 includes only the BEV and the PHEV, the server 600 may execute a process shown in FIG. 13 described below, instead of the process shown in FIG. 5.

Figure 13:
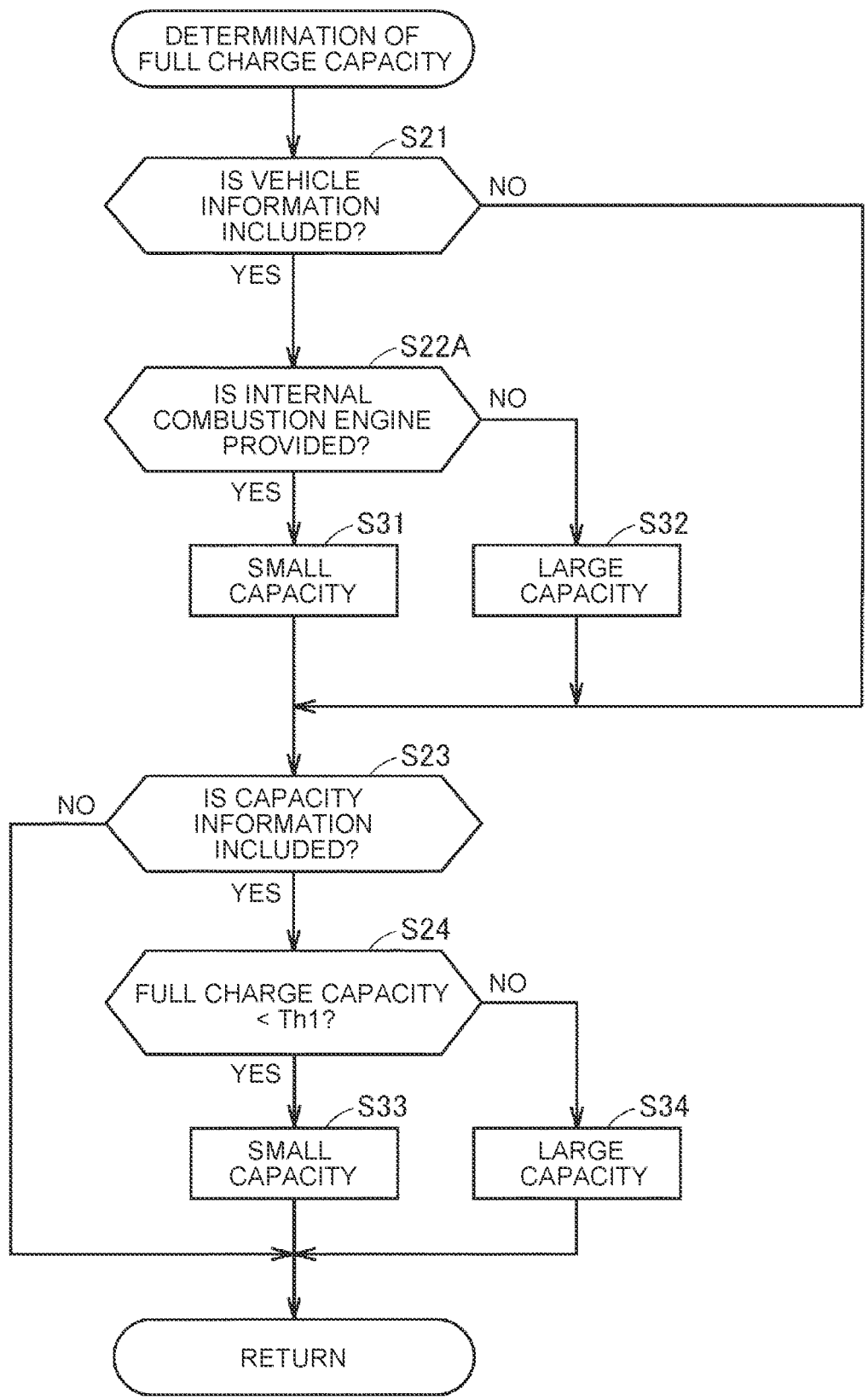
FIG. 13 is a flowchart showing a modification of the process shown in FIG. 5.

FIG. 13 is a flowchart showing a modification of the process shown in FIG. 5. The process shown in FIG. 13 is the same as the process shown in FIG. 5, except that S22A is adopted instead of S22 (FIG. 5). Hereinafter, S22A will be described.

With reference to FIG. 13 as well as FIGS. 1 to 3, in S22A, the server 600 determines whether the resource information acquired in S11 in FIG. 4 includes the vehicle information. The vehicle information indicates whether the target resource is the BEV or the PHEV. When the resource information includes the vehicle information (YES in S21), in S22A, the server 600 determines whether the target resource (electrified vehicle) includes the internal combustion engine based on the vehicle information. The fact that the target resource is the BEV means that the target resource does not include the internal combustion engine. On the other hand, the fact that the target resource is the PHEV means that the target resource includes the internal combustion engine. The vehicle information corresponds to an example of "first vehicle information" according to the present disclosure.

When the target resource includes the internal combustion engine (YES in S22A), the server 600 determines in S31 that the full charge capacity of the power storage device included in the target resource is small. On the other hand, when the target resource does not include the internal combustion engine (NO in S22A), the server 600 determines in S32 that the full charge capacity of the power storage device included in the target resource is large. When the determination is made in any of S31 and S32, the process proceeds to S23.

In the above modification, the configuration of the estimation unit 611 shown in FIG. 3 is changed as follows. The estimation unit 611 (first estimation unit) according to the present modification is configured to acquire the vehicle information (first vehicle information) indicating whether the xEV 100 includes the internal combustion engine, and is configured to estimate that the battery B1 is a large-capacity power storage device when the xEV 100 does not include the internal combustion engine and estimate that the battery B1 is a small-capacity power storage device when the xEV 100 includes the internal combustion engine (refer to S21, S22A, S31, and S32 in FIG. 13).

The process shown in FIG. 9 can be changed as appropriate. For example, S111 to S113 may be omitted. Alternatively, S114 to S117 may be omitted. Furthermore, all of the processes shown in FIG. 9 may be omitted. That is, S72 is not an essential configuration in the process shown in FIG. 7. In a mode in which S72 in FIG. 7 is omitted, the server 600 may execute the process shown in FIG. 14 described below before executing the process shown in FIG. 11.

Figure 14:
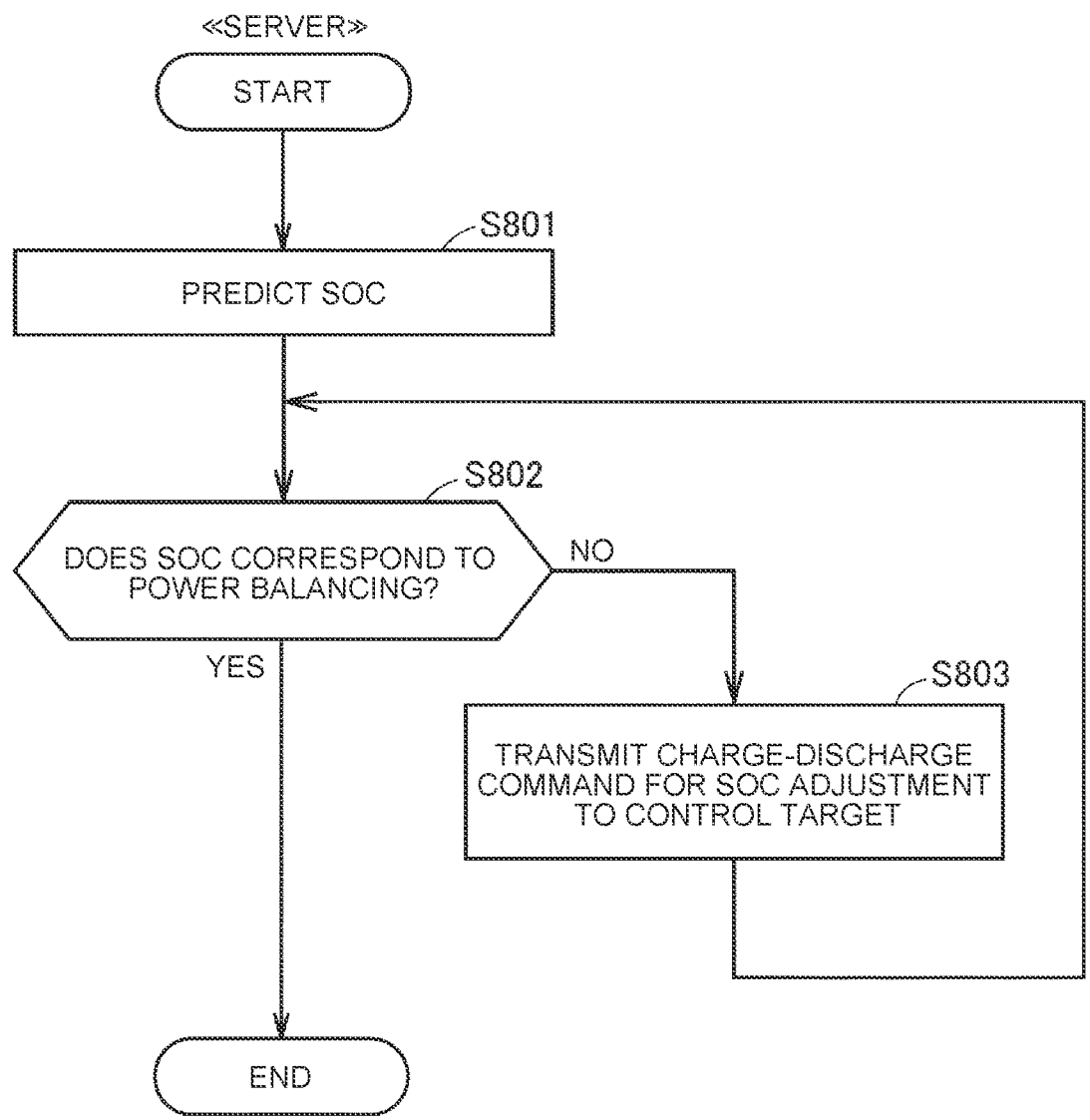
FIG. 14 is a flowchart showing a process related to state of charge (SOC) adjustment before power balancing executed by the control computer (server) in a modification.

FIG. 14 is a flowchart showing a process related to SOC adjustment before power balancing executed by the server 600 in a modification. The process shown in this flowchart is executed after the control target related to power balancing is selected in the process shown in FIG. 7 and before the process shown in FIG. 11 is started. The execution timing of the process may be a timing back from the start time of the power balancing by a predetermined time.

With reference to FIG. 14 as well as FIGS. 1 to 3, in S801, the server 600 predicts the SOC of the power storage device of the control target when the power balancing is conducted (more specifically, at the start of the power balancing). The prediction method may be the same as S114 in FIG. 9.

In the subsequent S802, the server 600 determines whether the SOC predicted in S801 corresponds to the charging electric energy or the discharging electric energy required for the power balancing. The determination method may be the same as S115 to S117 in FIG. 9.

When the server 600 determines NO (that the SOC does not correspond to the charging electric energy or the discharging electric energy) in S802, the server 600 adjusts the SOC of the power storage device of the control target so as to correspond to the charging electric energy or the discharging electric energy required for the power balancing in S803. Specifically, the server 600 transmits a charge-discharge command for adjustment of the SOC to the control target. The server 600 remotely controls the control target based on the charge-discharge command. Then, the process returns to S802. The transmission of the charge-discharge command (S803) is continuously executed until the server 600 determines YES (the SOC corresponds to the charging electric energy or the discharging electric energy) in S802. When the server 600 determines YES in S802, the series of processes shown in FIG. 14 ends.

Figure 15:
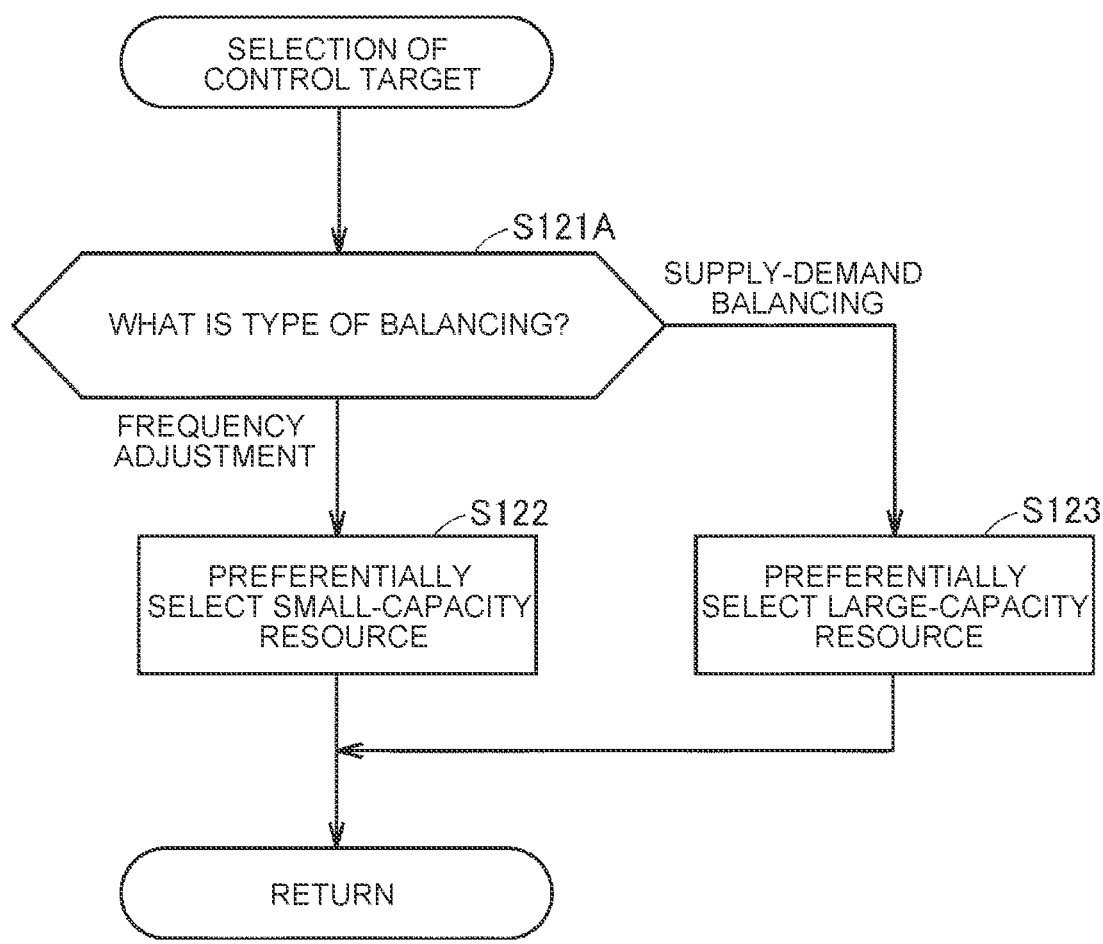
FIG. 15 is a flowchart showing a modification of the process shown in FIG. 10.

The server 600 may execute the process shown in FIG. 15 described below instead of the process shown in FIG. 10. FIG. 15 is a flowchart showing a modification of the process shown in FIG. 10. The process shown in FIG. 15 is the same as the process shown in FIG. 10, except that S121A is adopted instead of S121 (FIG. 10). Hereinafter, S121A will be described.

With reference to FIG. 15 as well as FIGS. 1 to 3, in S121A, based on the type and contents of power balancing acquired in S71 in FIG. 7, the server 600 determines whether the type of the power balancing is any of frequency adjustment and supply-demand balancing. When the type of power balancing is frequency adjustment, the process proceeds to S122. For example, when the type of power balancing acquired in S71 in FIG. 7 is any of the power balancing A to the power balancing F (refer to FIG. 8), the process proceeds to S122. When the type of power balancing is the supply-demand balancing, the process proceeds to S123. For example, when the type of power balancing acquired in S71 in FIG. 7 is any of the power balancing G to the power balancing J (refer to FIG. 8), the process proceeds to S123.

In the above modification, the configuration of the server 600 is changed as follows. The server 600 according to the present modification is configured to preferentially select, in S122 in FIG. 15, the power balancing resource provided with a small-capacity power storage device as the control target for the power balancing for adjusting the frequency of the power system PG (external electric power source), and is configured to preferentially select, in S123 in FIG. 15, the power balancing resource provided with a large-capacity power storage device as the control target for the power balancing for balancing supply and demand of the power system PG (external electric power source).

In the above embodiment, the server 600 conducts the power balancing that has been successfully bid in the power balancing market, using the power balancing resource. However, the present disclosure is not limited to this. The server 600 may conduct the power balancing in response to a request from a manager of the external electric power source (for example, the electric power company).

In the above embodiment, the control target is caused to function as the primary balancing power by causing the control target to execute the local control. However, the present disclosure is not limited to this. When the control target can be responsive within the response time (for example, 10 seconds) by the remote control, the request for the primary balancing power may be met by the remote control.

The electrified vehicle may be configured to conduct only any of power balancing by charging and power balancing by discharging. The electrified vehicle may include a charger instead of the charger-discharger 102. The electrified vehicle may be configured to be rechargeable in a non-contact manner. The electrified vehicle is not limited to a passenger car, and may be a bus or a truck. The electrified vehicle may be configured to be able to perform autonomous driving or may be equipped with a flight function. The electrified vehicle may be an unmanned vehicle (for example, an automated guided vehicle (AGV) or an agricultural machine). The power balancing resource may be a moving object other than the electrified vehicle (ship, an airplane, a drone, a walking robot, a robot cleaner, a space probe, etc.).

The embodiments disclosed herein should be considered to be exemplary and not restrictive in all respects. The scope of the present disclosure is shown by the scope of claims rather than the description of the embodiments above, and is intended to include all modifications within the meaning and the scope equivalent to the scope of claims.

What is claimed is:

1. A control system comprising:
a plurality of power balancing resources; and
a processor that controls each of the plurality of power balancing resources, wherein:
each power balancing resource includes a power storage device configured to be electrically connectable with an external electric power source;
the processor is configured to select one or more power balancing targets from among the plurality of power balancing resources, the power balancing targets to be included in a power balancing control that is performed using the external electric power source, and control each power balancing target of the one or more power balancing targets so as to cause the power storage device to charge or discharge for the power balancing;
the processor is configured to classify the power storage device as either a high capacity power storage device or a low capacity power storage device, the low capacity power storage device being a power storage device with a maximum capacity less than a maximum capacity of the high capacity power storage device; and
the processor is configured to
acquire information on a duration of the power balancing,
determine whether the duration of the power balancing is shorter than a threshold duration,
in a case where the duration of the power balancing is shorter than the threshold duration, execute a first power balancing control that causes the power balancing resource provided with the low capacity power storage device to charge or discharge for the power balancing, and
in a case where the duration of the power balancing is longer than the threshold duration, execute a second power balancing control that causes the power balancing resource provided with the high capacity power storage device to charge or discharge for the power balancing.

2. The control system according to claim 1, wherein
the power balancing resource is an electrified vehicle configured to travel using electric power stored in the power storage device,
the processor acquires first vehicle information of the power balancing resource, the first vehicle information indicating whether the electrified vehicle includes an internal combustion engine, and
the processor estimates that the power storage device of the electrified vehicle is the high capacity power storage device when the electrified vehicle does not include the internal combustion engine, and estimates that the power storage device is the low capacity power storage device when the electrified vehicle includes the internal combustion engine.

3. The control system according to claim 2, wherein
the processor is configured to:
acquire capacity information indicating a maximum capacity of the power storage device included in the power balancing resource;
identify whether the power storage device is either the high capacity power storage device or the low capacity power storage device based on the capacity information; and
classify the power storage device of the electrified vehicle as either the high capacity power storage device or the low capacity power storage device using an estimation result by the processor when the processor is not able to acquire the capacity information, and classify the power storage device of the electrified vehicle as either the high capacity power storage device or the low capacity power storage device using an identification result when the processor is able to acquire the capacity information.

4. The control system according to claim 1, wherein
the power balancing resource is an electrified vehicle configured to travel using electric power stored in the power storage device,
the processor acquires second vehicle information of the power balancing resource, the second vehicle information indicating whether the electrified vehicle includes an energy storage device for traveling in addition to the power storage device, and
the processor estimates that the power storage device is the high capacity power storage device when the electrified vehicle does not include the energy storage device, and estimates that the power storage device of the electrified vehicle is the low capacity power storage device when the electrified vehicle includes the energy storage device.

5. The control system according to claim 1, wherein:
the processor is configured to classify the power storage device as either a high-temperature operating power storage device that is less prone to deteriorate by charging and discharging at a high temperature or a low-temperature operating power storage device that is prone to deteriorate by charging and discharging at a high temperature; and
the processor is configured to exclude the power balancing resource provided with the low-temperature operating power storage device as a selection candidate for the power balancing target related to the power balancing when an outside temperature for conducting the power balancing is equal to or higher than a reference temperature.

6. The control system according to claim 1, wherein:
the processor is configured to predict a state of charge of the power storage device for each of the power balancing resources, the state of charge being a state when the power balancing is conducted; and
the processor is configured to determine whether the power balancing is able to be conducted by the power storage device using the predicted state of charge of the power storage device, and exclude the power balancing resource provided with the power storage device determined that the power balancing is not able to be conducted from a selection candidate for the power balancing target.

7. The control system according to claim 1, wherein:
the processor is configured to predict a state of charge of the power storage device of the power balancing target, the state of charge being a state when the power balancing is conducted;
compare the predicted state of charge of the power storage device of the power balancing target with required charging or discharging electric energy for the power balancing; and
in a case where the predicted state of charge of the power storage device of the power balancing target does not meet the required charging or discharging electric energy, charge or discharge the power storage device of the power balancing target and adjust the state of charge of the power storage device of the power balancing target so as to meet the required charging or discharging electric energy for the power balancing before the power balancing is conducted.

8. The control system according to claim 1, wherein
the processor is configured to
execute the first power balancing control that causes the power balancing resource provided with the low capacity power storage device to charge or discharge for the power balancing by local control or remote control, and
execute the second power balancing control that causes the power balancing resource provided with the high capacity power storage device to charge or discharge for the power balancing.

9. A power balancing method, comprising:
classifying, by a processor, a power storage device of each of a plurality of power balancing resources as either a high capacity power storage device or a low capacity power storage device with a maximum capacity less than a maximum capacity of the high capacity power storage device;
acquiring, by the processor, information on a duration of the power balancing;
determining, by the processor, whether the duration of the power balancing is shorter than a threshold duration;
causing, by the processor, the power balancing resource provided with the low capacity power storage device to charge or discharge for the power balancing in a case where the duration of the power balancing is shorter than the threshold duration; and
causing, by the processor, the power balancing resource provided with the high capacity power storage device to charge or discharge for the power balancing in a case where the duration of the power balancing is longer than the threshold duration.

* * * * *